(12) United States Patent
Nishii

(10) Patent No.: US 6,912,072 B2
(45) Date of Patent: Jun. 28, 2005

(54) IMAGE COMMUNICATION APPARATUS

(75) Inventor: Teruyuki Nishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 10/428,110

(22) Filed: May 2, 2003

(65) Prior Publication Data

US 2003/0193697 A1 Oct. 16, 2003

Related U.S. Application Data

(62) Division of application No. 09/237,244, filed on Jan. 26, 1999, now Pat. No. 6,608,704, which is a division of application No. 08/684,799, filed on Jul. 17, 1996, now Pat. No. 5,953,132.

(30) Foreign Application Priority Data

Jul. 18, 1995 (JP) ............................................. 7-203755
Jul. 26, 1995 (JP) ............................................. 7-190387

(51) Int. Cl.[7] ............................. H04N 1/40; H04N 1/32
(52) U.S. Cl. ....................................... 358/444; 358/468
(58) Field of Search ................................. 358/444, 442, 358/404, 468, 296, 401, 400

(56) References Cited

U.S. PATENT DOCUMENTS

| | | | |
|---|---|---|---|
| 4,142,214 A | 2/1979 | Yamazaki et al. | 358/257 |
| 4,229,114 A | 10/1980 | Van Horne | 400/492 |
| 4,571,633 A | 2/1986 | Kondo | 358/280 |
| 4,587,633 A | 5/1986 | Wang et al. | 358/479 |
| 4,587,644 A | 5/1986 | Fujiie | 359/44 |
| 4,677,257 A | 6/1987 | Ogasawara et al. | 178/4 |
| 4,713,699 A | 12/1987 | Nakamura et al. | 358/296 |
| 4,748,516 A | * 5/1988 | Harano et al. | 358/296 |
| 4,835,603 A | 5/1989 | Kano et al. | 358/75 |
| 4,866,543 A | 9/1989 | Cooper et al. | 360/15 |
| 4,910,871 A | 3/1990 | Logan | 33/18.2 |
| 5,031,115 A | 7/1991 | Hayashi | 395/101 |
| 5,043,918 A | * 8/1991 | Murahashi | 358/1.16 |
| 5,058,037 A | * 10/1991 | Kageyama et al. | 358/1.17 |
| 5,214,750 A | * 5/1993 | Minowa et al. | 358/1.12 |
| 5,506,657 A | 4/1996 | Ito et al. | 358/442 |
| 5,561,536 A | 10/1996 | Sugiura et al. | 358/500 |
| 5,575,575 A | * 11/1996 | Ide et al. | 400/185 |
| 5,600,762 A | * 2/1997 | Salgado et al. | 358/1.15 |
| 5,689,289 A | 11/1997 | Watanabe et al. | 347/7 |
| 5,726,769 A | 3/1998 | Imai et al. | 358/442 |
| 6,099,102 A | * 8/2000 | Tanaka et al. | 347/9 |

FOREIGN PATENT DOCUMENTS

JP 07-154590 6/1995

* cited by examiner

Primary Examiner—Madeleine Nguyen
(74) Attorney, Agent, or Firm—Fitzpatrick, Cella, Harper & Scinto

(57) ABSTRACT

An ink printer function and other facsimile functions are controlled by one CPU. Specifically, the CPU performs a recording process and other FAX processes in time division through a task. Further, an ink remaining amount check function of an ink jet printer is performed with priority over other processes by a timer interrupt operation.

3 Claims, 30 Drawing Sheets

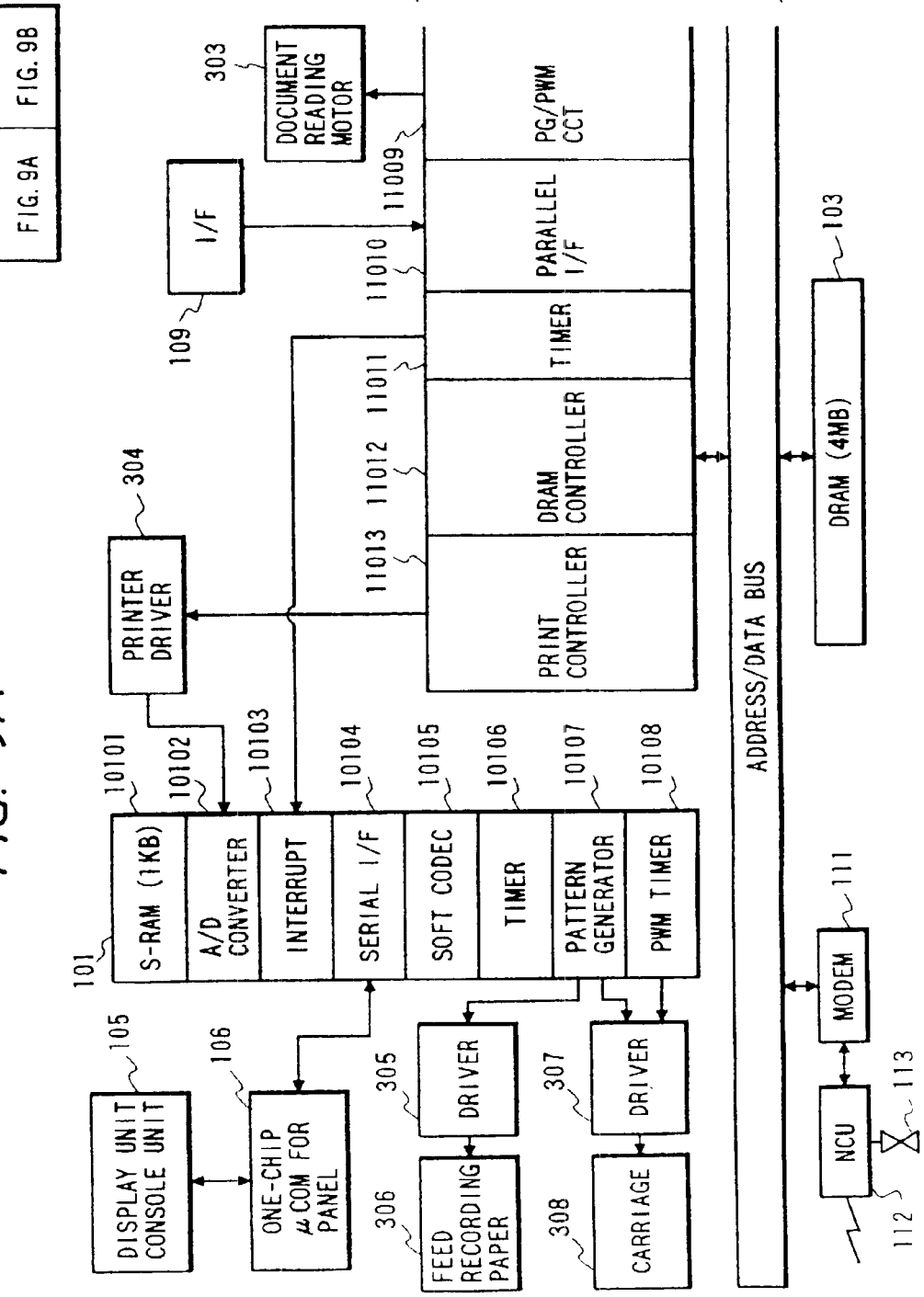

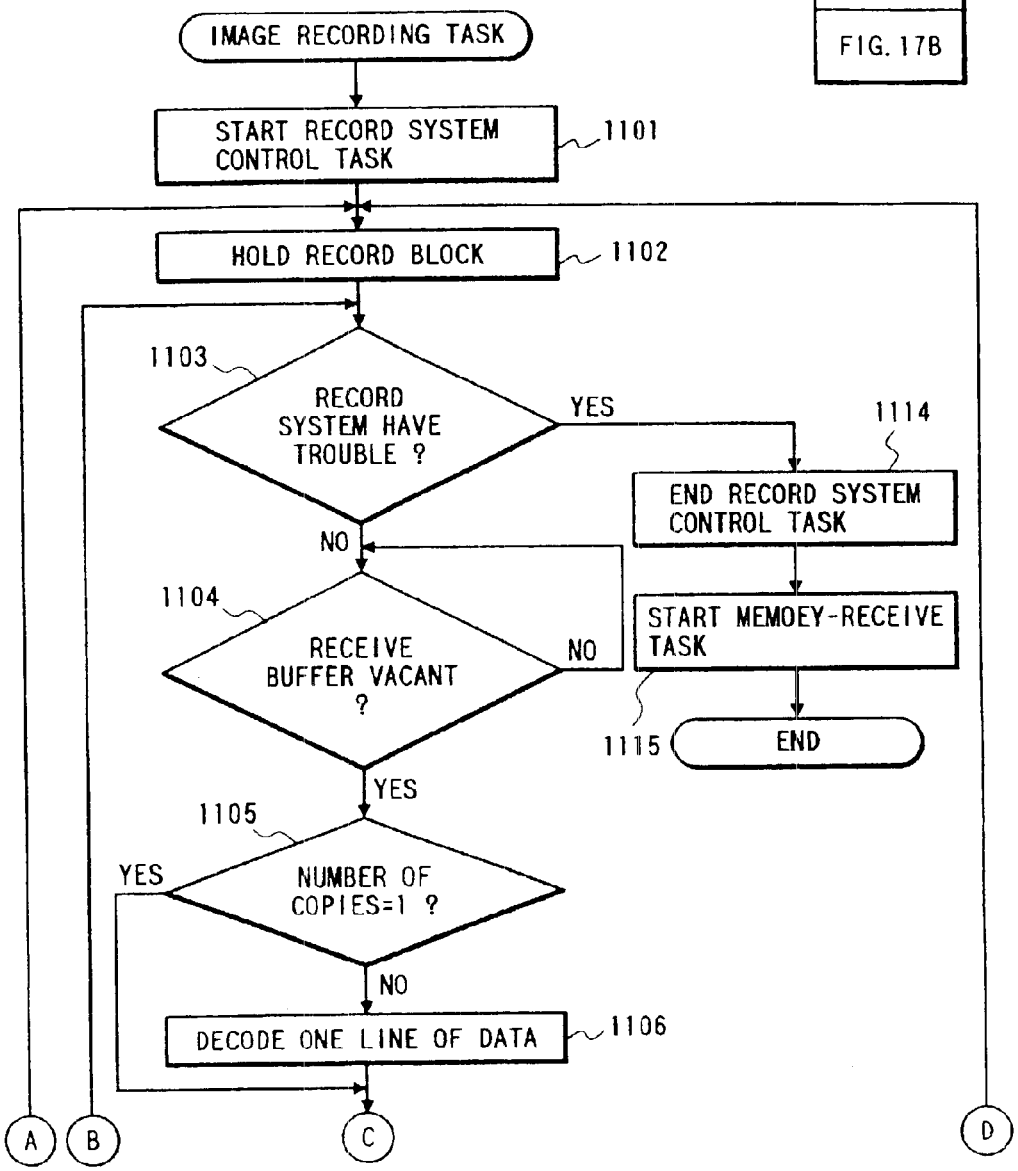

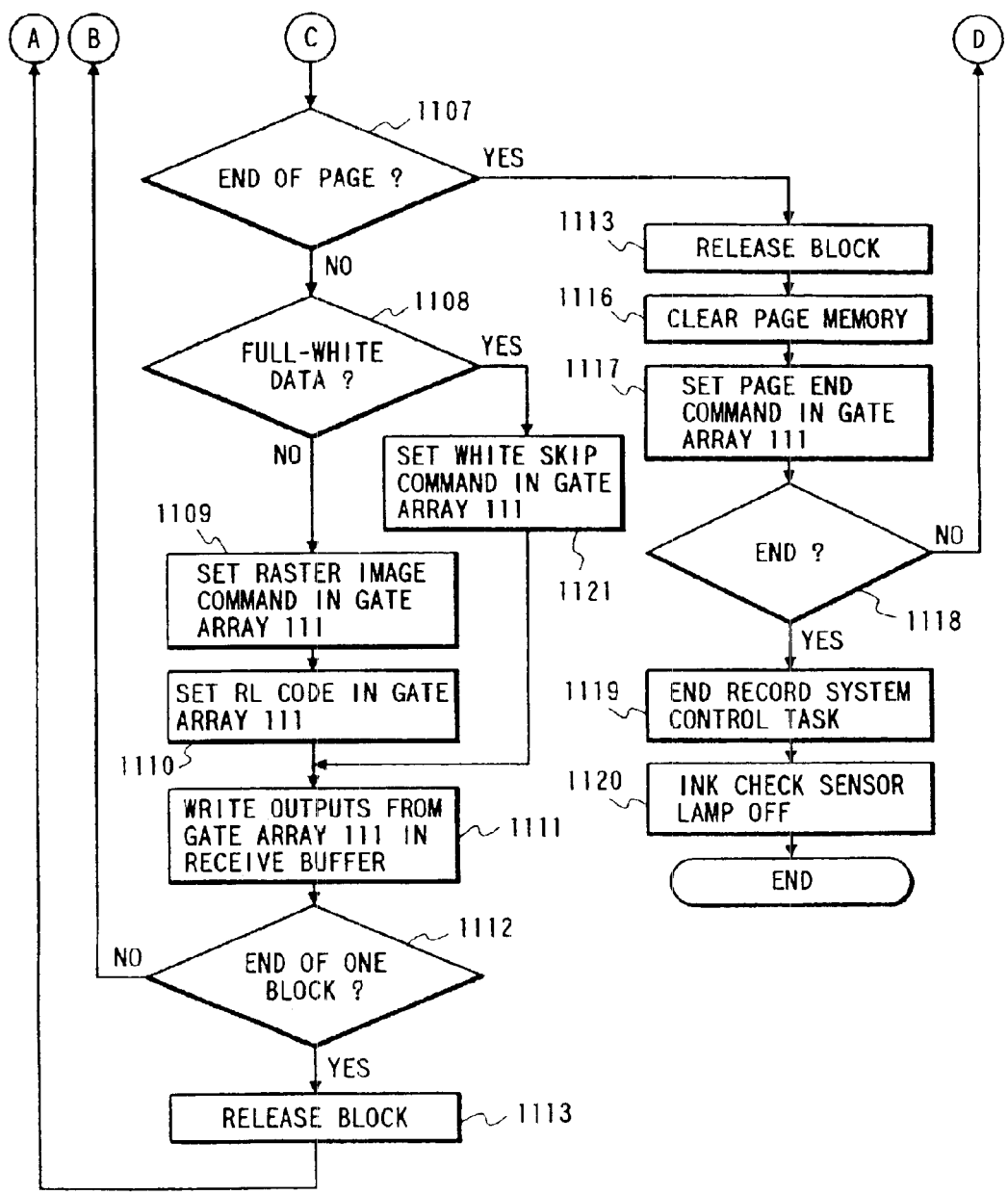

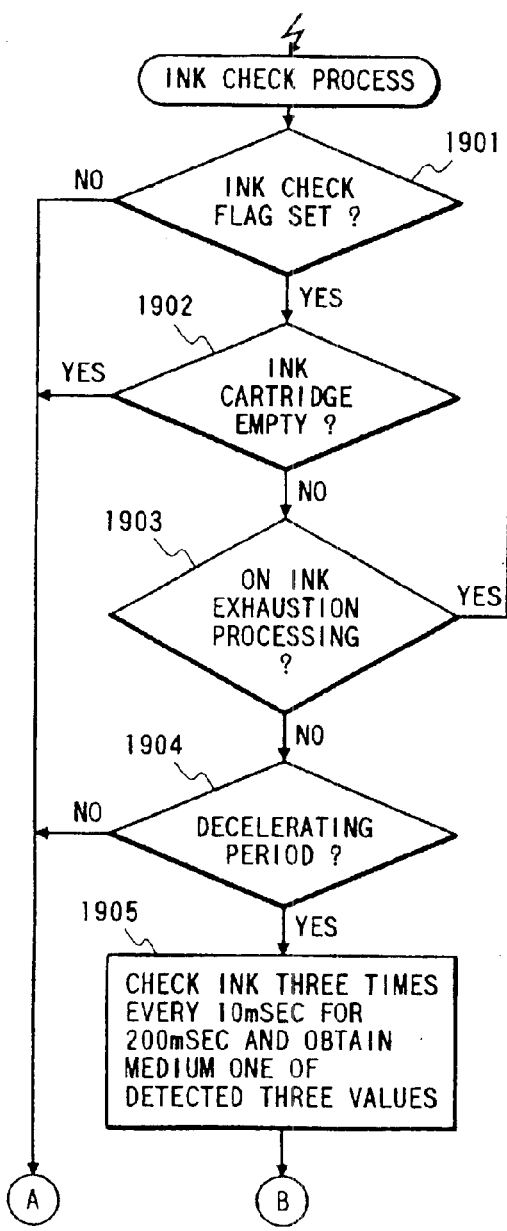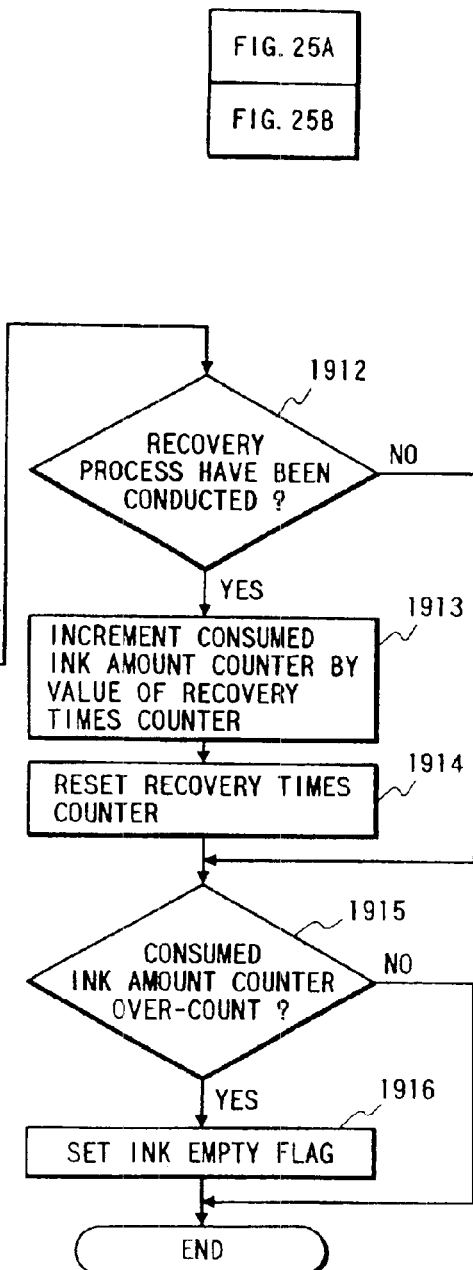
FIG. 25A
FIG. 25
| FIG. 25A |
| FIG. 25B |

IMAGE COMMUNICATION APPARATUS

This application is a division of application Ser. No. 09/237,244, filed on Jan. 26, 1999 now U.S. Pat. No. 6,608,704, which is a division of application Ser. No. 08/684,799, filed on Jul. 17, 1996 now U.S. Pat. No. 5,953,132. The entire disclosure of each prior application is incorporated herein by reference.

BACKGROUND OF THE INVENTION

1. Field of the Invention

The present invention relates to an image communication apparatus which has a recording apparatus of an ink jet recording system mounted thereon.

2. Related Background Art

FIG. 27 is a block diagram showing a constitutional embodiment of a conventional facsimile apparatus.

As shown in the figure, the conventional facsimile apparatus with an ink jet recording apparatus mounted thereon comprises a system involving a facsimile unit (containing a CPU, ROM and RAM) and a system involving a printer unit (containing a CPU, ROM and RAM), both systems being connected through a Centronics interface (I/F) provided as a receptacle on the printer side.

Therefore, both systems have many components duplicated, with neither fully exploiting its capabilities, resulting in bad cost performance. Further, a greater area is occupied by electrical parts of the facsimile apparatus, which impedes the miniaturization of the apparatus.

A system configuration of FIG. 27 will be described below.

In FIGS. 27, 21 to 35 show a system on the facsimile side, wherein a CPU 21 comprises a microprocessor, and controls, in accordance with a program stored in a ROM 22, the whole of the facsimile system including a RAM 23, a non-volatile RAM 24, a character generator (CG) 25, a reader 30, a modem unit 31, a network control unit (NCU) 32, a console unit 27, and a display unit 26.

The RAM 23 stores binary image data read by the reader 30 or binary image data to be printed by the printer, coded image data modulated by the modem unit 31 for output to a telephone line 33 via the NCU 32, and coded image data demodulated from analog waveform signal input through the telephone line 33 via the NCU 32 and the modem unit 31. The non-volatile RAM 24 can securely store data to be saved (e.g., abbreviated dial number) even when the electric power is shut off.

The character generator 25 is a ROM storing therein characters of JIS code or ASCII code to generate character data corresponding to a predetermined code, as required, under the control of the CPU 21. This character data is developed into image data for facsimile to be used in the communications or recording.

The reader 30 comprises a DMA controller, an image processing IC, an image sensor, and a CMOS logic IC, to binarize data read by the use of a contact-type image sensor (CS) under the control of the CPU 21, and to send its binarized data successively to the RAM 23.

Note that the set state of an original on the reader 30 can be detected by an original detector using a photosensor provided on the conveying passageway of the original.

The modem unit 31, which comprises G3, G2 modems and a clock generation circuit connected to these modems, modulates coded transmit data stored in the RAM 23, under the control of the CPU 21, for output to the telephone line 33 via the NCU 32.

Also, the modem unit 31 has an analog signal from the telephone line 33 input via the NCU 32, which signal is then demodulated and stored as coded receive data in the RAM 23.

The NCU 32 switches the telephone line 33 to connect to the modem 31 or a telephone set 34 under the control of the CPU 21. Also, the NCU 32 has means for detecting a call signal (CI), and sends an incoming signal to the CPU 21 when the call signal is detected.

The telephone set 34 is one integral with this facsimile apparatus, specifically composed of a handset, a speech network, a dialer, a ten key and a one-touch key. The console unit 27 comprises a key for starting the transmission and receive of image, a mode selection key for specifying the operation mode such as fine, standard, automatic receive at the transmission or receive time, and a ten key or one-touch key for the dialing.

The display unit 26 comprises an LCD module which is a combination of a 7-segment LCD for clock indication, a pictograph LCD for the indication of various modes, and a dot matrix LCD capable of display with 5×7 dots in 16 digits×1 row, and LEDs.

A resolution converter 29 converts binary data as sent from the reader 30 and then stored in the RAM 23, or received raw data as stored in the RAM 23 via the telephone line 33, the NCU 32 and the modem unit 31 and then decoded, from 8 dots/mm to a recording resolution of 360 dpi.

A CODEC unit 28 is a circuit for assisting the CPU 21 in decoding the received coded data, or coding raw data to be transmitted, composed of an RL (run length)/raw data conversion circuit, and a row data/RL conversion circuit.

A Centronics I/F 35 is an interface for passing print data to the printer or detecting the printer status, which corresponds to a Centronics I/F 41 on the printer side.

On the other hand, 36 to 43 is a system on the printer side, wherein a CPU 36, which comprises a microprocessor, controls the whole of the printer system comprising a RAM 38, a character generator (CG) 39, a print controller 42, an H-V converter 43, the Centronics I/F 41, and a display unit 40 in accordance with a program stored in a ROM 37.

The H-V converter 43 operates to prepare data in a main scan direction which extends transversely, for a number of lines equal to the number a of nozzles of an ink jet head, to take out the same number of data a at the same dot position in those lines in a sub-scan direction, and to rearrange them in the order of data to be supplied to the head, to obtain the data to be supplied to the head which is necessary at the time of actual recording.

The Centronics I/F 41 operates to receive data from the Centronics I/F 35 and stores it in the RAM 38, or return the printer status to the FAX or an external host (not shown), upon an instruction from the CPU 36.

The print controller 42 sends out print data H-V converted and then stored in the RAM 38 to the print head of the ink jet printer.

The character generator 39 storing font data therein, develops a font in accordance with a character code from the external host, when a switch circuit 44 changes over to select the external host. The display unit 40 includes an LED for indicating the state of the printer.

FIG. 28 is an explanatory diagram showing the operation of a conventional recording system as above described. Note that MO1 to MO6 in the figure each indicate a specific area of memory.

First, at S01, the recording RL data in M01 (RAM 23) is converted into raw data by an RL/raw conversion circuit within the CODEC unit 28, and transferred by DMA (direct memory access) to M02 (RAM 23). Next, at S02, the recording raw data is transferred by DMA to the resolution converter 29 to convert the resolution in the main scan direction from 8 dot/mm to 360 dpi.

The converted data is transferred by DMA to M03 (RAM 23). Then, data is overwritten on M03 to append command data to the top and end of data of one line and obtain raster data with command. Then, its data is sent by DMA to the Centronics I/F 35, then via the switch circuit 44 to the Centronics I/F 41, and further sent by DMA to a receive buffer of M04 (RAM 38).

Then, the CPU 36 analyzes a command stored in the receive buffer, recognizes the top and end of line, and transfers image data, with the command removed, to a raster buffer M05 (RAM 38). Then, data of M05 is sent to the H-V converter 43 at S07 for H-V conversion, after which data is sent to a print buffer of M06 (RAM 38). Then, its data is sent by DMA in succession to the print controller 42 for supply to the print head.

However, the above conventional system has the following drawbacks.

1) Since a facsimile system and a printer system are separately provided, there are many duplicate blocks, resulting in bad cost performance as compared as to the attained functions, considered as a whole.

2) With the great scale of circuit, the apparatus becomes large.

3) As the printer system is connected via Centronics I/F, a recording signal on the facsimile side must be converted for transmission into a form conforming to this interface, thus needing an additional block for adapting to Centronics I/F.

4) As the printer system is connected via Centronics I/F, a recording signal on the facsimile side must be converted for transmission into a form conforming to this interface, thus taking more time in recording on the facsimile side.

As another embodiment of such facsimile apparatus, there is provided one constituted as shown in FIG. 29 to effect fast processing, as described, for embodiment, in Japanese Laid-Open Patent Application No. 7-154590.

With such a constitution, however, two CPUs are required for the control of facsimile and that of printer, and for the image memory, at least two buffers are required for the facsimile and the printer, resulting in a large apparatus with higher price. Also, a separate work area is required for each of the CPUs. Further, there is a loss area in each memory which is used for neither the image buffer nor the work area.

Also, this apparatus has the following drawback, because the printer is a shuttle system of ink jet type even if the apparatus is simply realized with one CPU or one memory. That is, since the printer is required to effect complex, fast processing to drive the carriage for ink jet at high speed, it is difficult to receive or decode image data in real time during the operation of printer.

Similarly, it is also difficult to operate the printer at high speed during the receiving or decoding of image data.

Also, in order to detect whether or not received image has been normally recorded, it is conventionally common practice to confirm whether a predetermined mark can be recorded at a predetermined position on the recording sheet, or whether a discharge of the ink can be sensed by discharging the ink at a predetermined position. However, because of very heavy processing loads for recording or receiving, it is difficult to determine whether the recording is normally performed at an appropriate timing during the recording.

Also, in order to determine whether the image has been normally recorded, a method of detection using a photosensor is well known, but it is required to control the timing of turning on a light source to make a detection, after the output of light source became stable, which is complex.

Also, if the light source is lit up, even when it is unnecessary, it is subjected to severe aging deterioration.

SUMMARY OF THE INVENTION

The present invention has been achieved in the light of the aforementioned drawbacks, and its object is to provide an improved image communication apparatus.

Further, an object of the present invention is to provide an image communication apparatus which is inexpensive, small and capable of fast processing.

Further, it is another object of the present invention to provide an image communication apparatus which can readily and rapidly perform the transfer of data to a printer unit and the recording operation.

It is a further object of the invention to provide an image communication apparatus which can commonly use a memory for both an image communication unit and a recorder.

It is a still further object of the invention to provide an image communication apparatus which can perform a recording process and a receiving process in real time at high speed, the received data being recorded using a recording head of shuttle type.

It is another object of the invention to provide an image communication apparatus which can detect the presence or absence of consumable goods such as the ink at optimal timings.

It is another object of the invention to provide an image communication apparatus which can prevent aging deterioration of means for detecting the presence or absence of consumable goods such as the ink to the utmost.

The above and other objects of the invention will be more apparent from the accompanying drawings and the following description.

BRIEF DESCRIPTION OF THE DRAWINGS

FIG. 17, consisting of FIGS. 17A and 17B, shows a flowchart illustrating an image recording task.

DETAILED DESCRIPTION OF THE PREFERRED EMBODIMENTS

Figure 1:
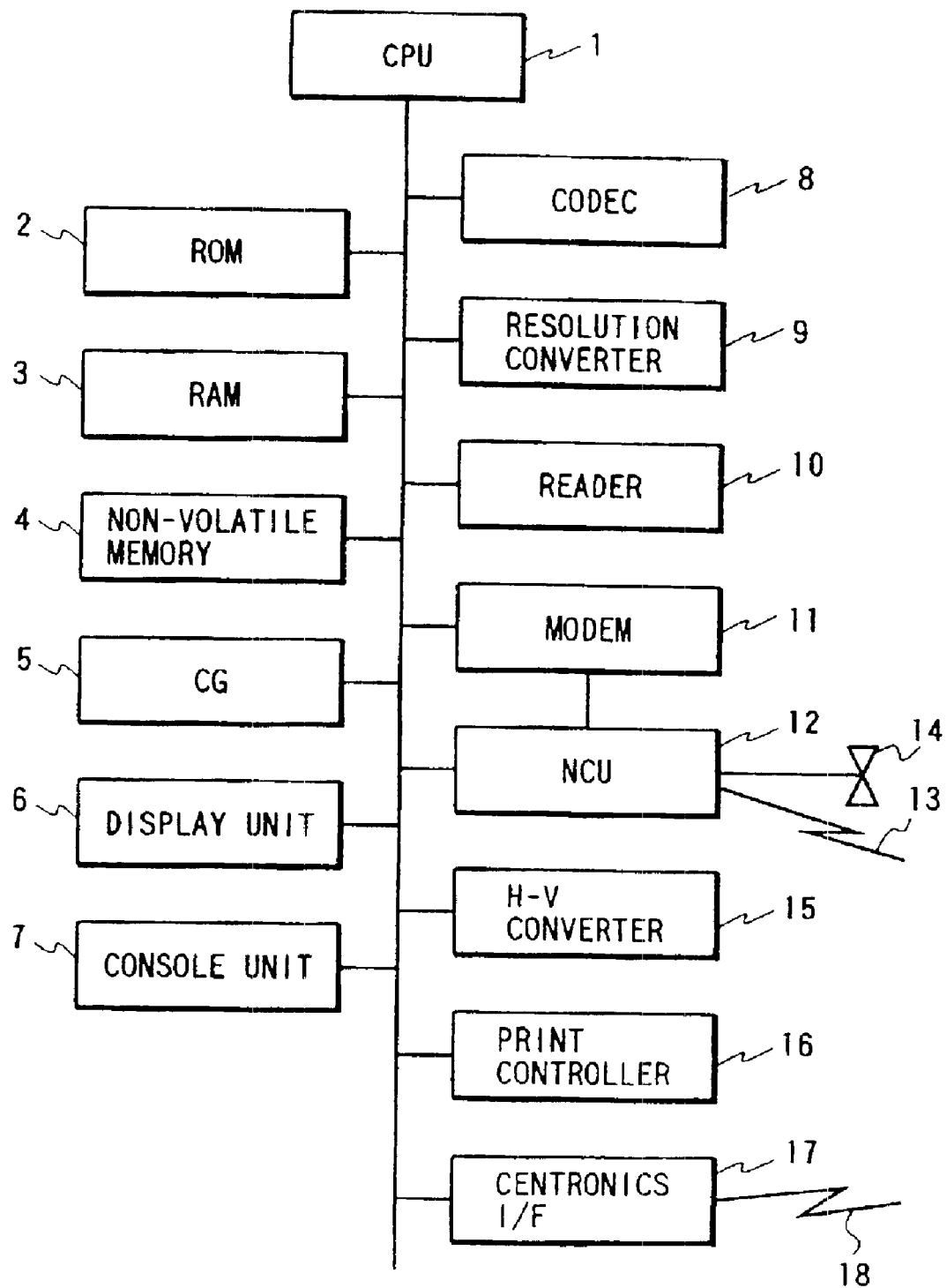
FIG. 1 is a block diagram showing a facsimile apparatus in an embodiment of the present invention.

FIG. 1 is a block diagram showing the configuration of a facsimile apparatus in an embodiment of the present invention.

A CPU 1 comprises a microprocessor, and controls, in accordance with a program stored in a ROM 2, a RAM 3, a non-volatile RAM 4, a character generator (CG) ROM 5, a reader 10, a print controller 16, a modem unit 11, a network control unit (NCU) 12, a console unit 7, a display unit 6, a CODEC unit 8, a resolution converter 9, an H-V converter 15, and a Centronics I/F 17.

The RAM 3 stores binary image data read by the reader 10 or binary image data to be printed by the printer controller 16, as well as coded image data modulated by the modem unit 11 for output to a telephone line 13 via the NCU 12, and coded image data demodulated from analog waveform signal input through the telephone line 13 via the NCU 12 and the modem unit 11.

The non-volatile RAM 4 can securely store data to be saved (e.g., abbreviated dial number) even when the electric power is shut off.

The ROM 5 stores the characters of JIS code or ASCII code, from which a character data corresponding to a predetermined code is read out, as required, under the control of the CPU 1.

The reader 10 is composed of a DMA controller, an image processing IC, an image sensor, and a CMOS logic IC, to binarize data read by the use of a contact-type image sensor (CS) under the control of the CPU 1, and to send its binarized data successively to the RAM 3.

Note that the set state of an original on the reader 10 can be detected by an original detector using a photosensor provided on the conveyance passageway of the original.

The print controller 16, which is composed of a DMA controller, an ink jet recording apparatus, and a CMOS logic unit IC, reads out record data stored in the RAM 3 under the control of the CPU 1 and prints it for output as a hard copy.

The modem unit 11, which is composed of G3, G2 modems and a clock generation circuit connected to these modems, modulates coded transmit data stored in the RAM 3 under the control of the CPU 1 and outputs it to the telephone line 13 via the NCU 12. Also, the modem unit 11 has an analog signal input from the telephone line 13 via the NCU 12, which signal is demodulated and stored as coded receive data in the RAM 3.

The NCU 12 switches the telephone line 13 to connect to either the modem unit 11 or the telephone set 14 under the control of the CPU 1. Also the NCU 12 has means for detecting a call signal (CI), and sends an incoming signal to the CPU 1 when the call signal is detected.

The telephone set 14 is one integral with a facsimile apparatus, specifically composed of a handset, a speech network, a dialer, a ten key and a one-touch key.

The console unit comprises a key for starting the transmission and receiving of image, a mode selection key for specifying the operation mode such as fine, standard, automatic receive at the transmission or receiving time, and a ten key or one-touch key for the dialing.

The display unit 6 comprises an LCD module which is a combination of a 7-segment LCD for the indication of clock, a pictograph LCD for the indication of various modes, and a dot matrix LCD capable of display with 5×7 dots in 16 digits×1 row, and LEDs.

The CODEC unit 8 is a circuit for assisting the CPU 21 in decoding the coded data, or encoding the raw data. This CODEC unit 8 is composed of a raw data/RL (run length) conversion circuit, and an RL/raw data conversion circuit.

The resolution converter 9 converts binary data as sent from the reader and the saved in the RAM 3, or raw data as decoded by the CPU 1, using the CODEC unit 8 from received coded data saved in the RAM 3 via the telephone line 13, the NCU 12 and the modem unit 11, from 8 dot/mm to a resolution of 360 dpi for recording. This resolution converter 9 converts the resolution only in a main scan direction, to store thus-converted data in the RAM 3.

The H-V converter 15 operates to prepare data in the main scan direction which extends transversely, by a number of lines a equal to the number of nozzles of an ink jet head, to take out data at the same dot position on the lines in a sub-scan direction, in an equal number of data a, and to rearrange them in the order of data to be supplied to the head, to obtain the data to be supplied to the head which is necessary at the actual recording. The Centronics I/F 17 is connected via a Centronics cable 18 to an external host computer, to store data from the host computer in the RAM 3 or send back the status of facsimile apparatus or data to the host computer.

In this embodiment, two conventional systems are integrated, wherein the CPU 1 is required to perform the operation of facsimile and that of printer at the same time, and experiences its greatest load when the printer is operating. Thus, in integrating two systems, the CPU 1 is switched between the facsimile task and the printer task under the task control.

Figure 6:
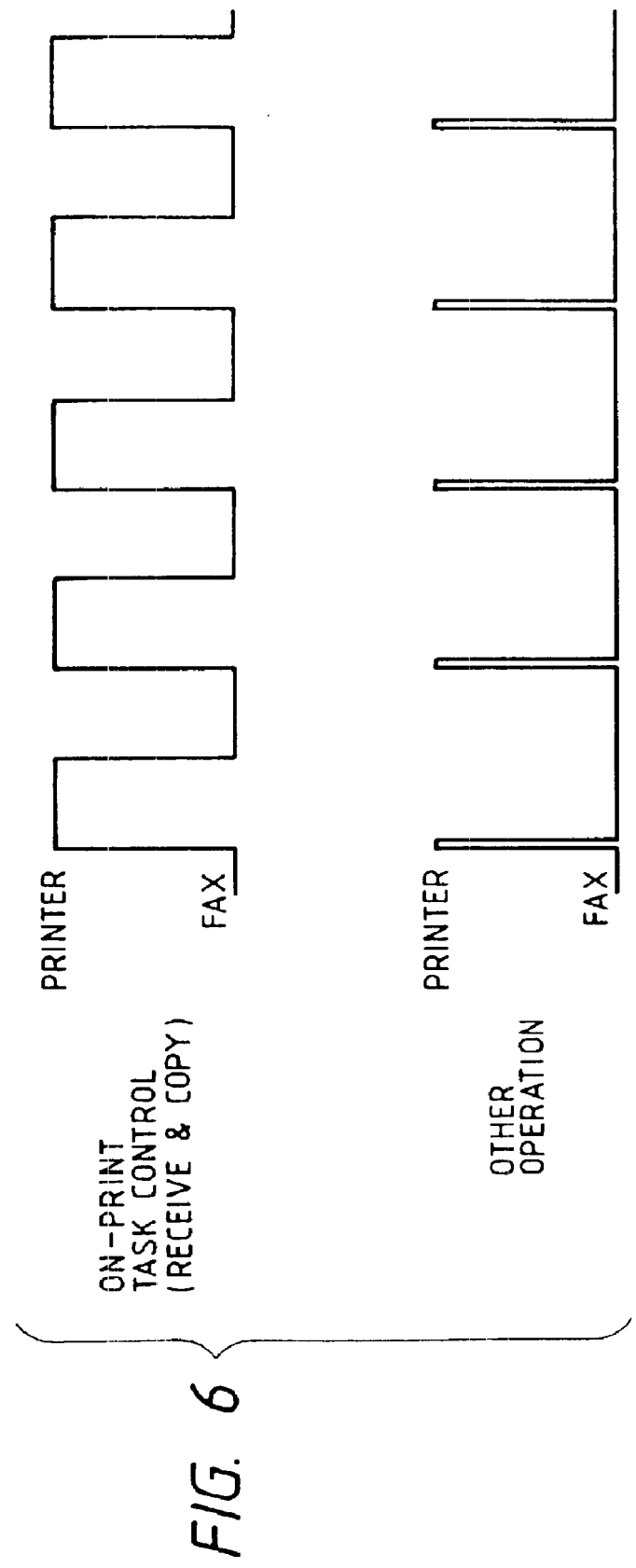
FIG. 6 is a timing chart showing how the task control of CPU is performed in each of the above embodiments.

FIG. 6 is a timing chart showing how the CPU 1 performs the task control.

In FIG. 6, the printer and the facsimile are switched at an equal interval during the printing. However, on other operations, the printer task is configured to exit in a shorter time, and in practice the CPU is substantially occupied by the FAX although the printer task is switched on at a certain interval.

Figure 2:
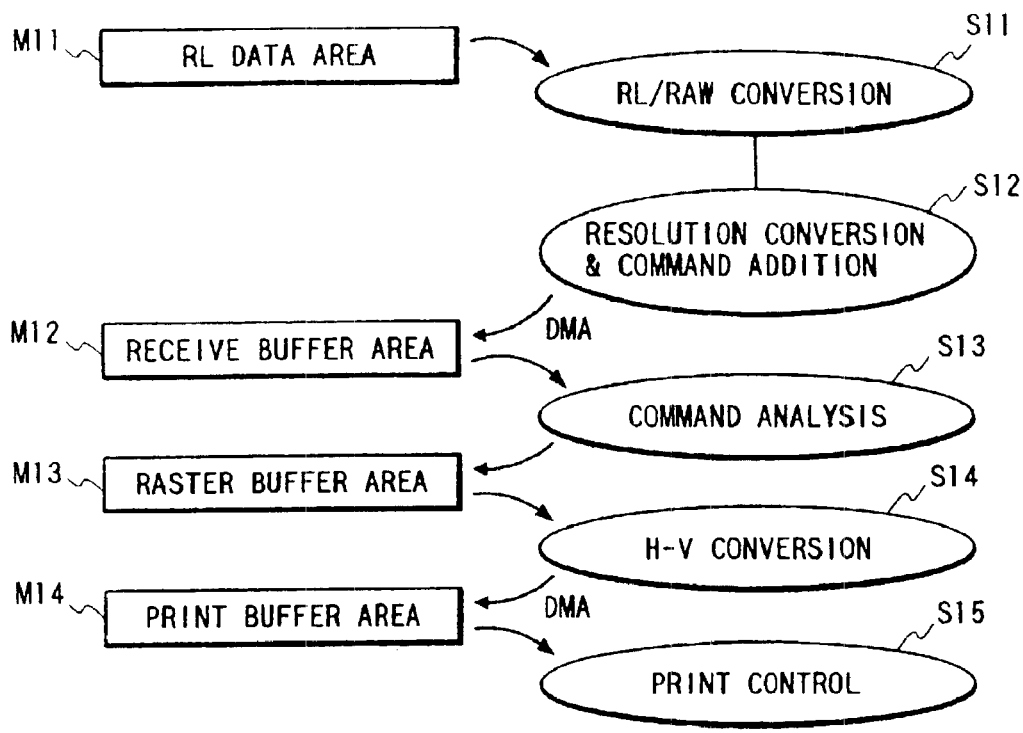
FIG. 2 is a flowchart showing the operation of a recording system in a first embodiment of the invention.
Figure 4:
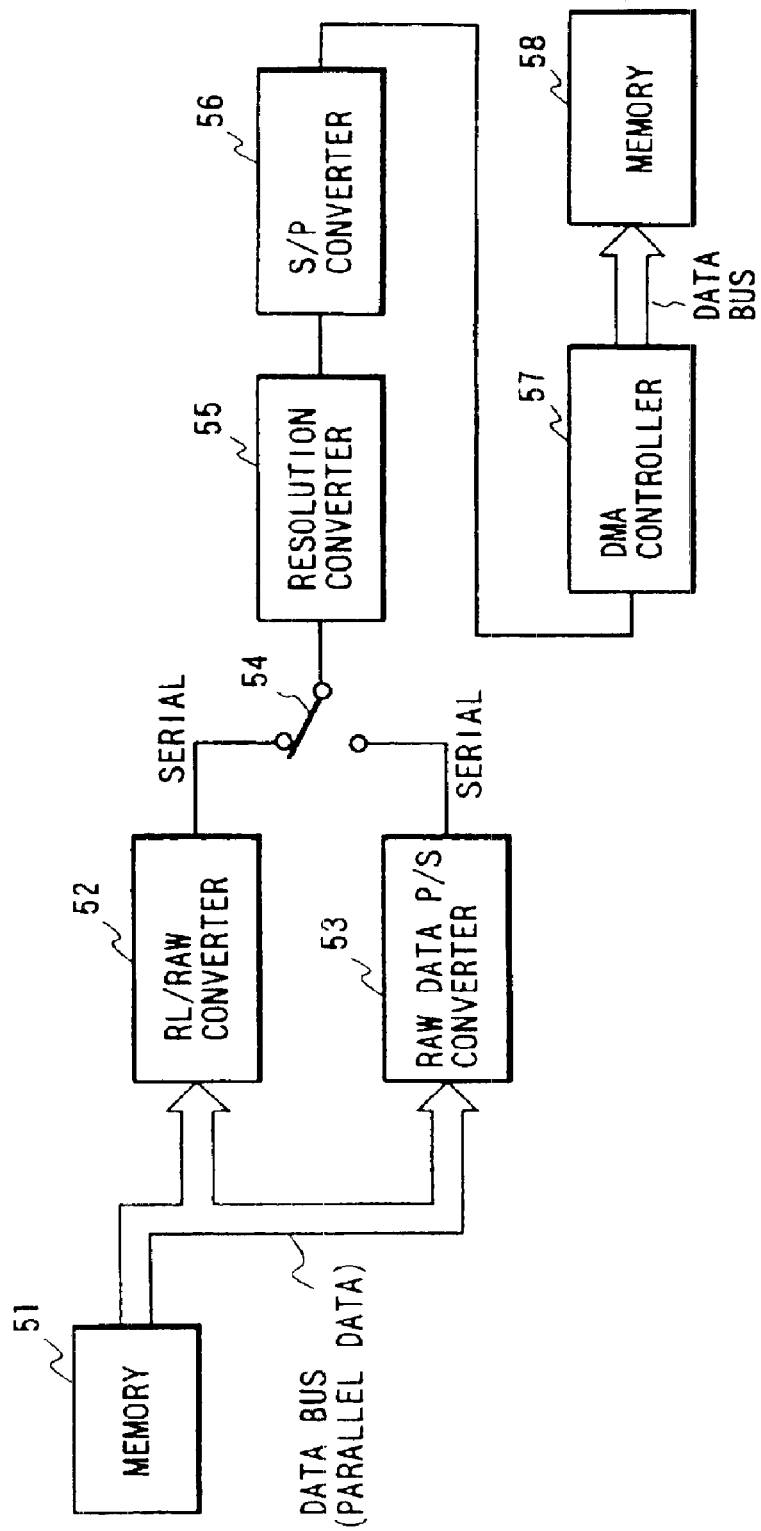
FIG. 4 is a block diagram showing the configuration of a resolution conversion and command addition unit in the first embodiment.

FIG. 2 is a flowchart showing the operation of a recording system in a first embodiment of the present invention. Note that M11 to M14 each indicate a specific area within a memory (RAM 3). Also, S11 to S15 each indicate a step on the operation. FIG. 4 is a block diagram showing the configuration of a resolution conversion and command addition unit in this embodiment.

First, M11 stores recording RL data. A memory 51 of FIG. 4 corresponds to it. Herein, considering the processing of one line, a switch 54 is first connected to the lower side for a raw data parallel/serial converter 53, so that the CPU 1 passes command data to the raw data parallel/serial converter 53. This command data is directly converted from parallel to serial form, and passed through the switch 54 to the resolution converter 55. For the command, the resolution converter 55 is set at equal magnification, wherein the command data is directly converted from serial to parallel form again, passed via the DMA controller 57 and sent by DMA to a receive buffer M12.

Then, the switch 54 is set to the RL/raw converter 52, wherein image RL data of one line is transferred from the memory 51 to the RL/raw converter 52 within the CODEC 8 for parallel/serial conversion as well as conversion into the raw data. And its data is sent via the switch 54 to the resolution converter 55 for multiplied conversion from 8 dot/mm to 360 dpi.

The data is serial-to-parallel converted in the serial/parallel converter 56, passed via the DMA controller 57, and sent by DMA to the receive buffer M12. Thereafter, the switch 54 is connected to the lower side for the raw data parallel/serial converter 53 again, so that the CPU 1 sends the command data to the raw data parallel/serial converter 53. The command data is directly parallel-to-serial converted, and sent through the switch 54 to the resolution converter 55.

For the command, the resolution converter 55 is set at equal magnification, whereby the command is directly serial-to-parallel converted, passed via the DMA controller 57, and sent by DMA to the receive buffer M12. With the above, the processing of one line is ended. Similarly, RL data of a plurality of lines are transferred to M12.

Then, the CPU 1 analyzes the command at S13, and transfers only image data to the raster buffer M13. Thereafter, the CPU 1H-V converts data of M13 in the H-V converter 15 at S14, and sends data suitable for the print head to the print buffer of M14. Then, its data is sent by DMA to the print controller 16, and modified to a print head signal at S15 for printing by means of the print head.

With the above constitution, the following effects can be provided.

1) The number of data transfers between memory and logic in the operation of recording system can be significantly decreased, thereby attaining high speed printing in the facsimile apparatus.

2) The capability of CPU can be fully exploited, despite the integration of two systems, whereby a system with high cost performance can be provided without degrading the performance of the apparatus.

A second embodiment of the present invention will be described below.

Note that this second embodiment has the same configuration as the first embodiment (FIG. 1, FIG. 4), and also the same task control of the CPU as the first embodiment (FIG. 6).

Figure 3:
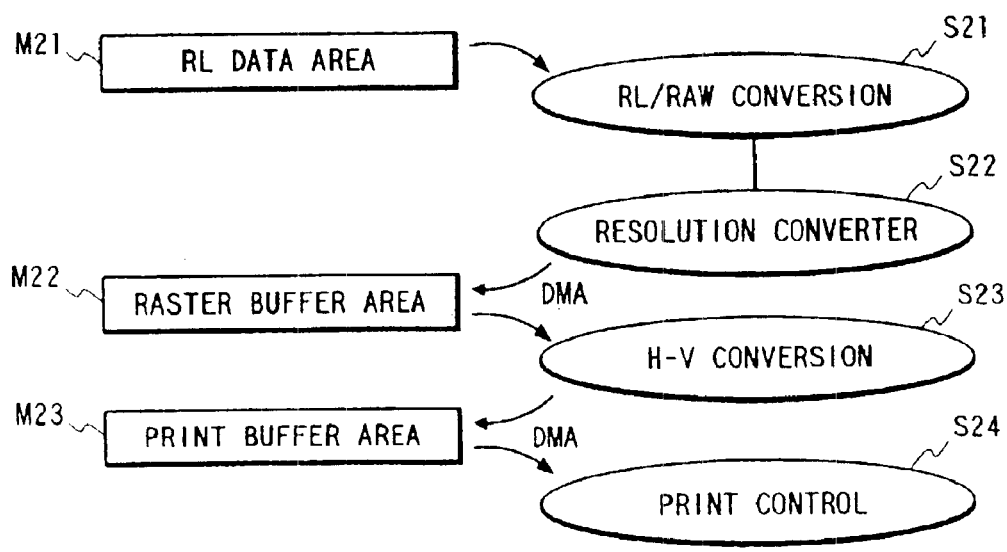
FIG. 3 is a flowchart showing the operation of a recording system in a second embodiment of the invention.

FIG. 3 is a flowchart showing the operation of a recording system in this second embodiment.

First, the switch 54 of FIG. 4 is connected to the side of RL/raw data converter 52 when M21 is RL data. The recording RL data of M21 corresponding to the memory 51 is sent to the RL/raw data converter 52 at S21 for conversion, then sent via the switch 54 to the resolution converter 55 (capable of equal to double magnification) for resolution conversion, serial-to-parallel converted in the serial/parallel converter 56, and transferred via the DMA controller 57 to the memory 58 or the raster buffer M22. Thereafter, the data is H-V converted at S23, and stored in the print buffer M23. Its data is sent by DMA to the print controller 16 at S24 for printing.

Also, when M21 is recording raw data (direct copy mode), the switch 54 is set to the side of parallel/serial converter 53. And raw data of M21 is serial-to-parallel converted by the parallel/serial converter 53 at S21, sent via the switch 54 to the resolution converter 55 for conversion of resolution and then stored in M22 in the same manner.

With the above configuration, the following effects are provided.

1) The number of data transfer between memory and logic in the operation of recording system can be significantly decreased below that of the first embodiment, attaining high speed printing in the facsimile apparatus.

2) The capability of CPU can be fully exploited, despite the integration of two systems, whereby a system with high cost-performance can be provided without degrading the performance of the apparatus.

A third embodiment of the present invention will be described below.

This third-embodiment is a variation of the second embodiment as above described. Note that this third embodiment has the same configuration as the first embodiment (FIG. 1, FIG. 4), and the same task control of CPU as the first embodiment (FIG. 6).

Also, the operation of recording system is similarly performed as in the second embodiment (FIG. 3). And this third embodiment is different from the second embodiment in that the recording raw data is processed in direct copy mode.

Figure 5:
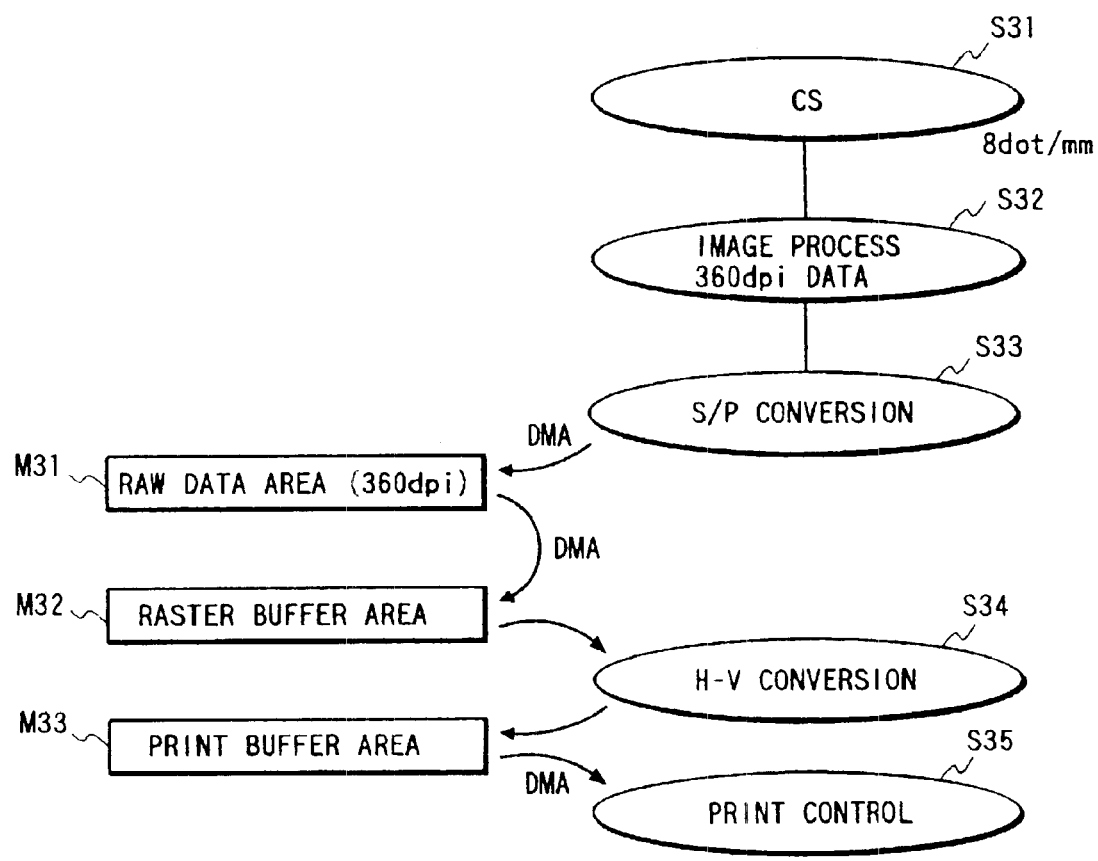
FIG. 5 is a flowchart showing the copying operation in a third embodiment of the invention.

FIG. 5 is a flowchart showing the copying operation in this third embodiment.

First, the switch 54 of FIG. 4 is connected to the side of RL/raw data converter 52 when M21 is RL data.

The recording RL data of M21 corresponding to the memory 51 is sent to the RL/raw data converter 52 at S21 for conversion, then sent via the switch 54 to the resolution converter 55 for resolution conversion, serial-to-parallel converted in the serial/parallel converter 56, and transferred via the DMA controller 57 to the memory 58 or the raster buffer M22. Thereafter, the data is H-V converted at S23, and stored in the print buffer M23. Its data is sent by DMA to the print controller 16 at S24 for printing.

Also, for the recording of raw data M31 (direct copy mode), an analog video signal input from CS (contact-type image sensor) at S31 is converted from analog to digital form at S32, and converted from 8 dot/mm of pixel to 360 dpi at multiple magnification, so that binary image data subjected to an image processing such as an error diffusion process is sent out serially.

At S33, its data is serial-to-parallel converted, and transferred by DMA to a raw data area of M31. Thereafter, its data is transferred by DMA to a recording raster buffer of M32, and converted from horizontal to vertical form by the H-V converter 15 and sent to a print buffer of M33, and further sent by DMA to the print controller 16 for printing. Herein, M22 and M32, and M23 and M33 are the same areas within the memory.

With the above configuration, the following effects are provided.

1) The number of data transfers between memory and logic in the operation of recording system can be significantly decreased below that the first embodiment, attaining high speed printing in the facsimile apparatus.

2) Further, by bypassing the resolution converter in the direct copy mode, the transfer of read raw data in the print controller can be made faster than in the second embodiment.

3) The capability of CPU can be fully exploited, despite the integration of two systems, whereby a system with high cost performance can be provided without degrading the performance of the apparatus. Also, the circuit dimensions can be almost halved, resulting in a smaller apparatus.

A facsimile apparatus in another embodiment of the present invention will be described below.

Figure 7:
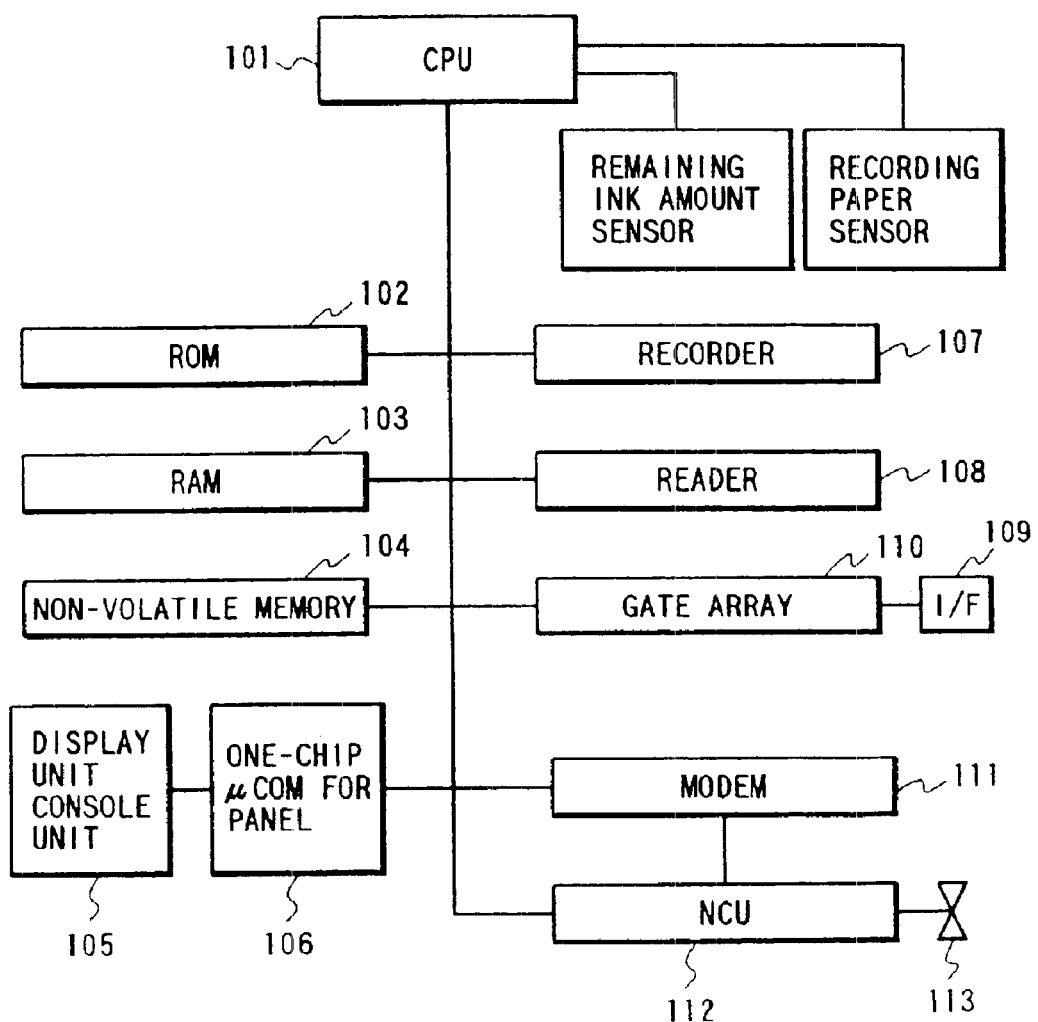
FIG. 7 is a block diagram showing the configuration of a facsimile apparatus in another embodiment of the present invention.

FIG. 7 is a block diagram showing the configuration of the present invention.

Numeral 101 denotes a CPU composed of a microprocessor for controlling the whole of the facsimile apparatus of this invention.

Numeral 102 denotes a ROM having a capacity of 8 Mb for storing a control program or a process program which the CPU 101 executes. Numeral 103 denotes a RAM having a capacity of 4 Mb for use as an image buffer area for storing the image for FAX transmission or receiving or the image which has been read in copying, an image buffer area for recording which is used for the recording process, and a work area for use when the CPU 101 executes a control program or process program. Numeral 104 denotes a non-volatile memory having a capacity of 64 Kb composed of a DRAM, an SRAM or an $E^2$ PROM equipped with a backup electric power source to allow the information to be kept in memory even if the power supply from a power source unit, not shown, is shut off.

Numeral 105 denotes a display unit or console unit having a keyboard and a liquid crystal panel.

Numeral 106 denotes a one-chip microcomputer for panel to manage the information to be displayed on the display unit or information operated on the console unit, or communicate the display and console information to the CPU 101.

Numeral 107 denotes a recorder for performing the recording by means of a recording head of ink jet system. Numeral 108 denotes a reader for reading the image.

Numeral 109 denotes an interface for connection to an external information processing terminal, comprised of a bi-centronics interface. Numeral 110 denotes a multifunction gate array for the interface to the external information processing terminal or performing the image processing. Numeral 111 denotes a modem unit, numeral 112 a network control unit (NCU), and numeral 113 a telephone set.

Figure 8:
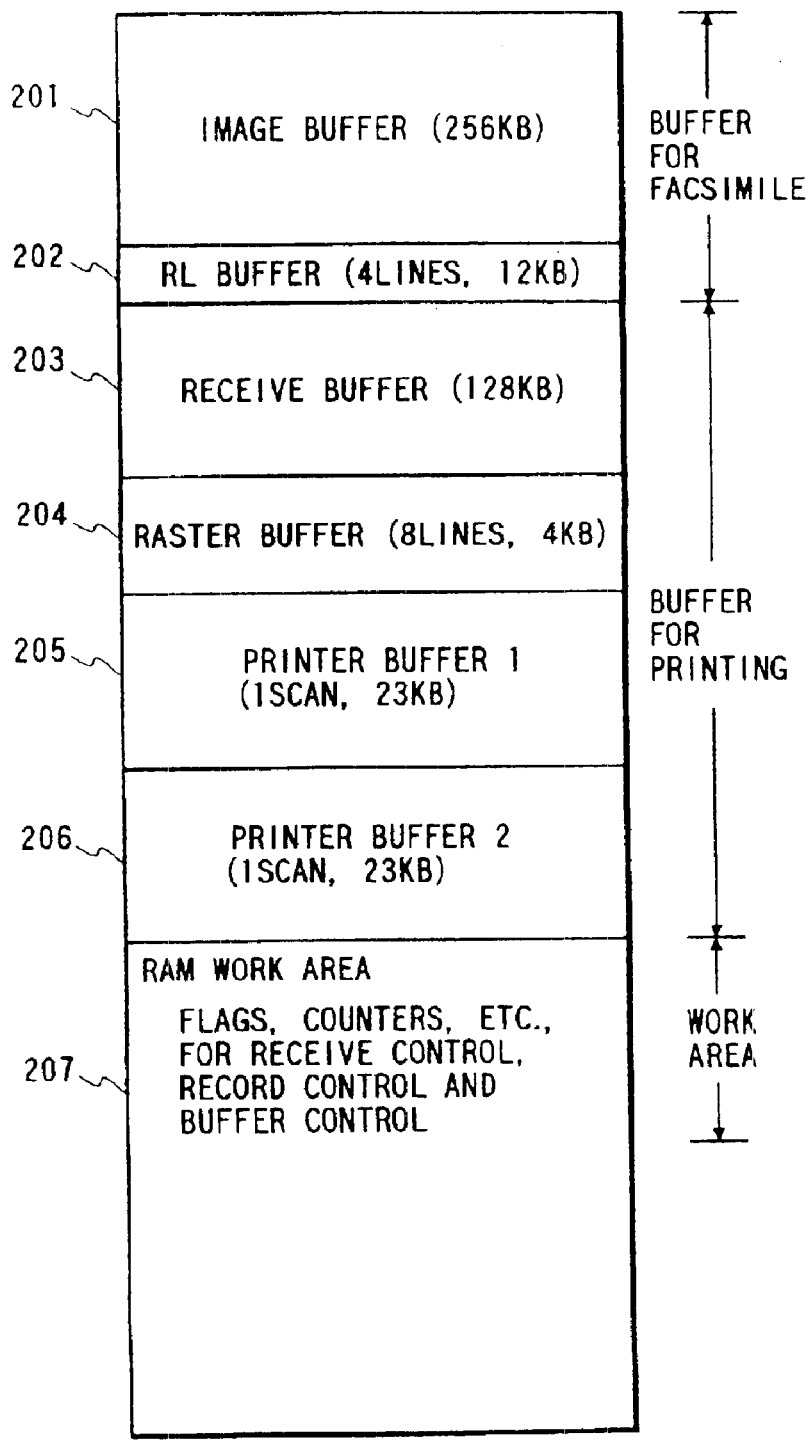
FIG. 8 is a diagram illustrating the configuration of a DRAM.

Referring now to FIG. 8, there is shown the configuration of DRAM 103 in greater detail. Numeral 201 denotes an image buffer area having a capacity of 256 KB for use in sending and receiving the image. In the image buffer 201, the image is managed in units of 4 KB.

Numeral 202 denotes a buffer for storing the runlength data, with a capacity of a total of five lines, including two lines (about 17 KB) for each of encoding and decoding, and one line for recording. Numeral 203 denotes a receive buffer having a capacity of 64 KB for temporarily storing received image or copied image which has been converted into the dot image, or a print command received from the external information processing terminal not shown via the external interface 109. Numeral 204 denotes a raster buffer having a capacity of 8 lines (about 4 KB).

If this raster buffer 204 has stored data of 8 lines, the data from the left end of the raster buffer 204 is successively sent to the H-V conversion circuit 204 for H-V conversion, and transferred to either a print buffer 1 (205) or a print buffer 2 (206). Both the print buffers 1, 2 are memories having a storage capacity (about 23 KB) corresponding to the amount of data to be recorded by one scanning of the recording head 2, wherein one of them is used for reading (recording) data, while the other is used for storing data for the next scan.

The CPU 101 counts the number of H-V conversions for data of 8 lines, wherein if it counts 8 times, that is, if the H-V conversion for data of 64 lines is completed, it issues a print start signal, considering that data for one main scan been prepared, to start the movement of carriage, and the recording operation based on data stored in the print buffer 1 (205) or print buffer 2 (206). And data is sent for every 64 dots to the recorder 107, which performs the recording by driving the discharge heaters of the recording head 210 in accordance with the data latched in the recorder 107. Meanwhile, data for the next main scan is stored in the other print buffer.

207 is a work area used by the CPU 101 to execute the program.

Herein, a variety of flags or counters for the control of receiving and recording, and the management of buffer, are administered: specifically, a record block present flag, a printer error flag, a block counter, a receive counter, a decoder counter, an RL buffer pointer, an error check counter, a block management area, a receive buffer write position counter, a receive buffer read position counter, a decode counter 2, a raster buffer counter, an H-V conversion execution counter, a print flag, an ink check flag, a scan direction flag, a carriage drive counter, a record width counter, a carriage drive pattern area ink empty flag, an ink exhaustion flag, a recovery times counter, an ink consumption amount counter, and a print amount counter. In this manner, within one memory, not only the image buffers for receiving and recording, but also a variety of flags and counters for the control of receiving and recording, and the management of buffer, are administered, thereby allowing the miniaturization of the apparatus.

Also, the buffer size can be optimized, with unnecessary areas reduced.

Figure 9B:
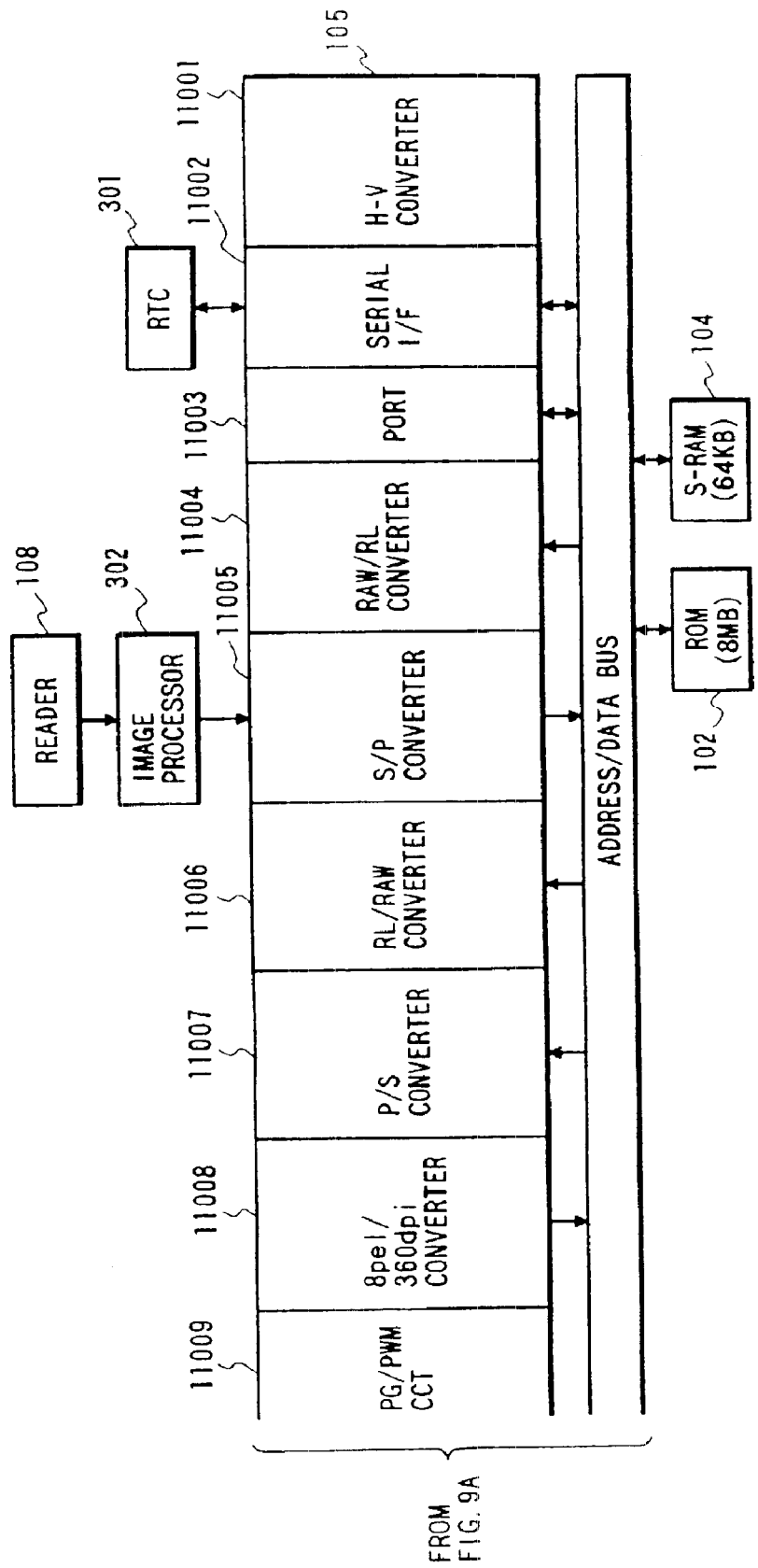
FIG. 9, consisting of FIGS. 9A and 9B, shows a diagram illustrating the details of the facsimile apparatus as shown in FIG. 7.

Referring now to FIGS. 9A and 9B, the system configuration of FIG. 7 will be described in greater detail. In FIGS. 9A and 9B, like numbers are used to indicate the same parts as in FIG. 7, and will not described any more. Numeral 301 denotes an RTC which is an IC having the clock function. This clock IC 301 transmits and receives clock data to and from the one chip microcomputer 106 for panel. Based on this clock data, the recovery operation of recording system, timer transmission and timer polling are performed.

Numeral 302 denotes an image processing circuit for the correction or binarization of an image signal read by the reader 108.

Numeral 303 denotes a document reading motor for conveying the original.

Numeral 109 denotes an interface (Bi-Centronecs I/F) for transmission and receive of data to and from the external information processing terminal not shown.

Numeral 304 denotes a printer driver for controlling the discharge of ink in accordance with data in the print buffers 205, 206.

Numeral 305 denotes a driver for driving the motor conveying the recording sheet.

Numeral 306 denotes a motor for conveying the recording sheet.

Numeral 307 denotes a motor driver for driving the motor conveying the ink jet print head.

Numeral 308 denotes a carriage motor for conveying the ink jet print head.

Next, the multifunction gate array 110 will be described in greater detail.

Numeral 11001 denotes an H-V conversion circuit for H-V converting data within the raster buffer 204, converted data being written into the print buffers 205, 206.

Numeral 11002 denotes a serial I/F for enabling data for clock display to be sent to or received from the one-chip microcomputer for panel.

Numeral 11003 denotes a port for sensors, not shown.

Numeral 11004 denotes a raw/RL converter for converting raw image data read by the reader 108 into RL data which is then stored in the RL buffer 202.

Numeral 11005 denotes a serial/parallel converter for converting image data read by the reader 108 from serial to parallel form.

Numeral 11006 denotes an RL/raw image converter for converting the run-length data of received image into raw image data. The raw image data produced herein is transferred to the resolution converter 11008.

Numeral 11007 denotes a parallel/serial converter wherein when image data read by the reader 108 is copied singly, image data is converted into parallel data at 11005, and the data stored in the image buffer 201 is converted into serial data again, which is then transferred to the resolution converter 11008.

Numeral 11008 denotes a resolution converter for converting the image having 8 pel into the image having a resolution of 360 dpi for use with the print head.

Numeral 11009 denotes a pulse width modulation circuit for controlling the current amount flowing to the reading motor.

Numeral 11010 denotes a parallel I/F for connection between the bi-centronics interface 109 and the facsimile.

Numeral 11011 denotes a timer for use in executing an interrupt processing.

Numeral 11012 denotes a DRAM controller for controlling the access to or refresh of DRAM.

Numeral 11013 denotes a print controller which allows a print signal to be generated in accordance with the content of the print buffer 205, 206.

Then, the function of CPU 101 will be described below. 10101 is an SRAM of 1 KB which is used for the heat control of the recording system requiring the fast processing, and the drive control for the carriage.

Numeral 10102 denotes an A/D converter for A/D converting the output of thermistor for use in regulating the temperature within the ink jet head.

Numeral 10103 denotes an interrupt processor for executing the interrupt process upon an instruction from the timer 11011.

Numeral 10104 denotes a serial interface for enabling the display or console information to be transmitted to or received from the one-chip microcomputer for panel 106.

Numeral 10105 denotes a soft CODEC for converting the image of run-length code into MMR, MR or MH code, or the coded data of MMR, MR or MH into the run-length code.

Numeral 10106 denotes a timer for the management of task.

Numeral 10107 denotes a pattern generator for generating the pattern to excite the motor such as a recording sheet conveying motor 306, or a carriage driving motor 308.

Numeral 10108 denotes a PWM timer for controlling the current amount flowing to the carriage driving motor 308.

First, the construction of a recorder in the facsimile apparatus will be described below.

Figure 10:
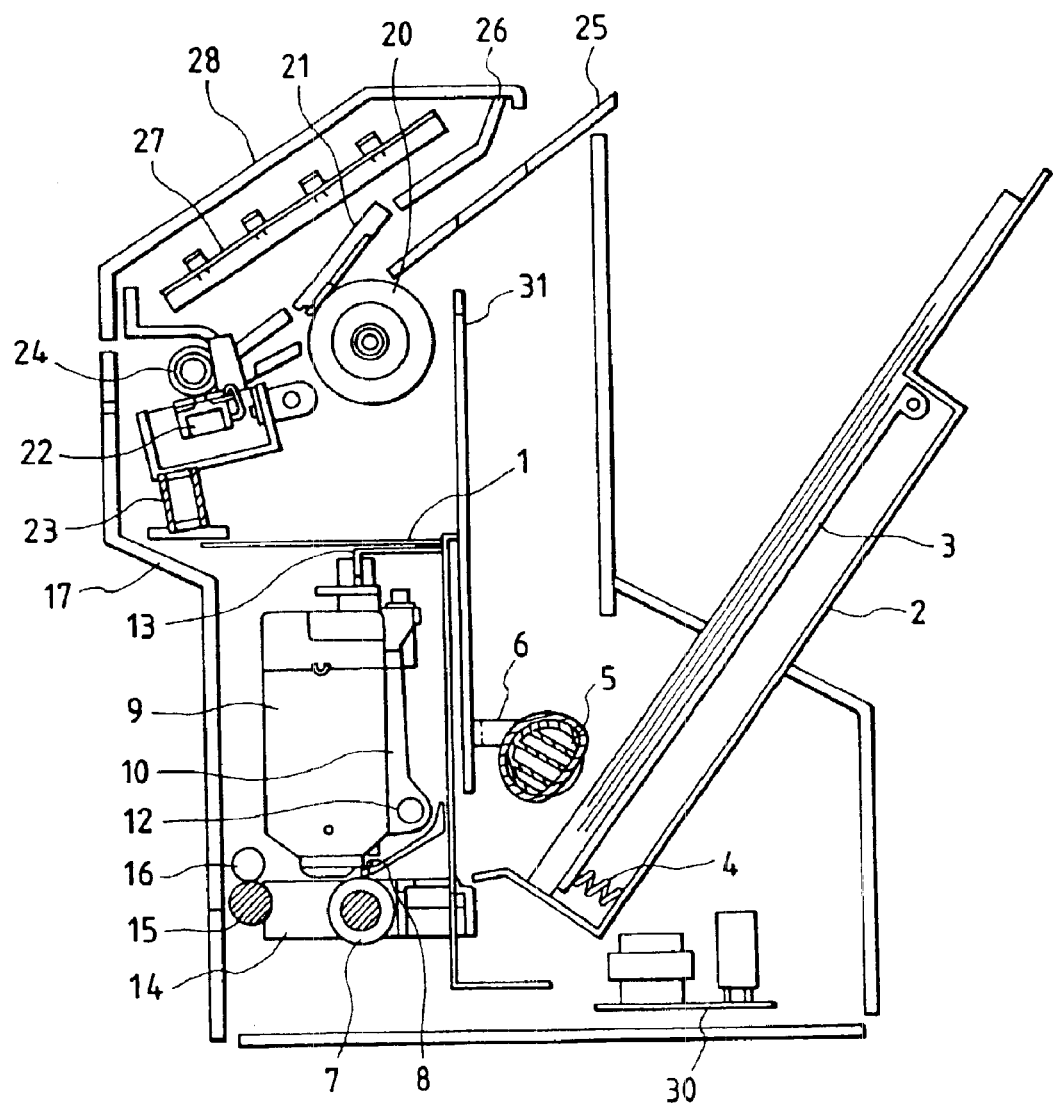
FIG. 10 is a cross-sectional view of the facsimile apparatus as shown in FIG. 7.

In FIG. 10, numeral 1 denotes a frame which is a main structure of the entire apparatus, and numeral 2 denotes an ASF (Auto Sheet Feeder) chassis secured to the frame 1. The ASF chassis 2 is a structure of ASF unit which is loaded with a plurality of recording sheets which are then separated one by one for the recording, and fed into the recorder. Also, numeral 3 denotes an intermediate plate, and numeral 4 denotes an intermediate plate biasing spring. The intermediate plate 3 is rotatably attached to the ASF chassis 2, as well as being biased in a clockwise direction as shown in the figure by the intermediate plate biasing spring 4. Numeral 5 denotes a recording sheet separation roller which rotates clockwise in the figure by a drive system (not shown), and numeral 6 denotes a transmission type sensor (hereinafter, a roller position sensor) for sensing the home position of the recording sheet separation sensor 6.

Note that the position of the intermediate plate 3 as shown in FIG. 10 corresponds to a wait state where the intermediate plate 3 has been rotated counterclockwise by a cam portion (not shown) of the drive system and stopped therein. When the cam is out of engagement therewith, the intermediate plate can be rotated clockwise to abut against the outer periphery of the recording sheet separation roller 5. Also, the operation of the intermediate plate 3 is in synchronization with a notch position of the recording sheet separation roller 5.

Numeral 7 denotes a recording sheet conveying roller which is rotated counterclockwise by the drive system 306, and numeral 8 denotes a recording sheet conveying roll provided in contact with the outer periphery of the recording sheet conveying roller 7 by a spring (not shown). The recording sheet conveying roller 7 and the recording sheet conveying roll 8 carry the recording sheet therebetween and convey it to the left in the figure (hereinafter this conveying direction is referred to as a sub-scan direction). Numeral 9 denotes an ink cartridge of replaceable type (disposable type) containing a recording head of the ink jet system and an ink tank for storing the ink integrally, and numeral 10 denotes a carriage on which the ink cartridge 9 is detachably mounted.

By the way, a recording face of the ink cartridge 9 is on the lower side of the ink cartridge 9, wherein the head recording face is formed with a plurality of nozzles arranged in a transverse direction. In the recording operation, the ink cartridge 9 is moved in a direction orthogonal to the array of nozzles (vertical direction in the figure, which is referred to as a main scan direction), so that the recording can be carried out over the area of recording width by discharging the ink selectively from the nozzles. Thus, the recording operation is repeated while the recording sheet is conveyed by a recording width in the sub-scan direction, until the recording is completed on the recording sheet (such recording system is referred to as a multi-scan system).

Also, the carriage has an ink remaining amount sensor using a reflection type photosensor to sense the ink remaining amount within the ink cartridge 9. The sensing direction of this ink remaining amount sensor is substantially the same as the reciprocatory direction of the ink cartridge 9, and it is needless to say that this ink remaining amount sensor is moved together with the ink cartridge 9, when the carriage 10 is moved, because it is attached to the carriage 10. Note that this will be described in greater detail hereinafter.

Numerals 12, 13 denote guide rails for guiding the carriage 10 to reciprocate in the main scan direction smoothly, the carriage 10 being attached to the two rails 12, 13 to be movable in the main scan direction, and reciprocated by the drive system (not shown). Numeral 14 denotes a platen, located opposite the recording head, for securing the recording sheet beneath the recording head, while keeping the distance between them at the recording position, numeral 15 denotes a paper ejection roller, and numeral 16 denotes a paper ejection roll. The paper ejection roll 16 is biased against the paper ejection roller 15 by a biasing member (not shown), carrying the recording sheet at a nip between the paper ejection roller 15 and the paper ejection roll 16 to exhaust the recording sheet. Numeral 17 denotes a recording sheet cover which is opened at a lower fulcrum when the ink cartridge 9 is replaced.

Next, the constitution of the reader of the facsimile apparatus will be described below.

Numeral 20 denotes a reading separation roller which is rotated counterclockwise by the drive system (not shown) to convey a plurality of originals that have been set, one by one, to the left as shown in the figure, numeral 21 denotes a separation piece made of a high friction material such as a rubber, which is biased against the reading separation roller 20 by a biasing member (not shown) to separate one by one the plurality of originals that have been set, numeral 22 denotes a contact-type line image sensor (hereinafter an image sensor) for reading an image drawn on the original and converting the information represented by the image into an electrical signal, numeral 23 denotes a CS spring, and numeral 24 denotes a white CS roller which is rotated clockwise by the drive system (not shown). Herein, the CS spring 23 is provided to bias the image sensor 22 against the CS roller 24. Also, the CS roller 24 has the roles of placing the original into intimate contact with the entire reading face of the image sensor 22, conveying the original in a left direction, and serving as a background in reading the original.

Numeral 25 denotes an original guide for guiding the lower surface of original, which is secured to the frame 1 and also used as a structure for supporting the reader and a console panel (hereinafter described), numeral 26 denotes an original guide for guiding the upper surface of original, which is secured to the original guide 25, numeral 27 denotes a console board provided with the operation switches, and numeral 28 denotes an operation panel having the console board 27 secured thereto and which is itself secured to the original guide 25.

Numeral 30 denotes a power source comprised of a power transformer and a condenser, and numeral 31 denotes an electric control board for controlling the operation of overall apparatus attached to the frame 1. The electric control board 31 has connected therewith all the wires from the electrical elements or parts (image sensor 22, console board 27, power source 30, ink cartridge 9, various drive motors (not shown), roller position sensor 6, sensors (not shown)). Although not explained herein, various types of sensors provided in the reader and a sensor for sensing the presence or absence of the recording sheet are packaged in the electric control board 31, without intervention of the wire. Also, all the external interfaces (e.g., public telephone network interface, additional child telephone interface, external child telephone interface, personal computer interface such as Centronics) can be connected to the electric control board 31.

Figure 11:
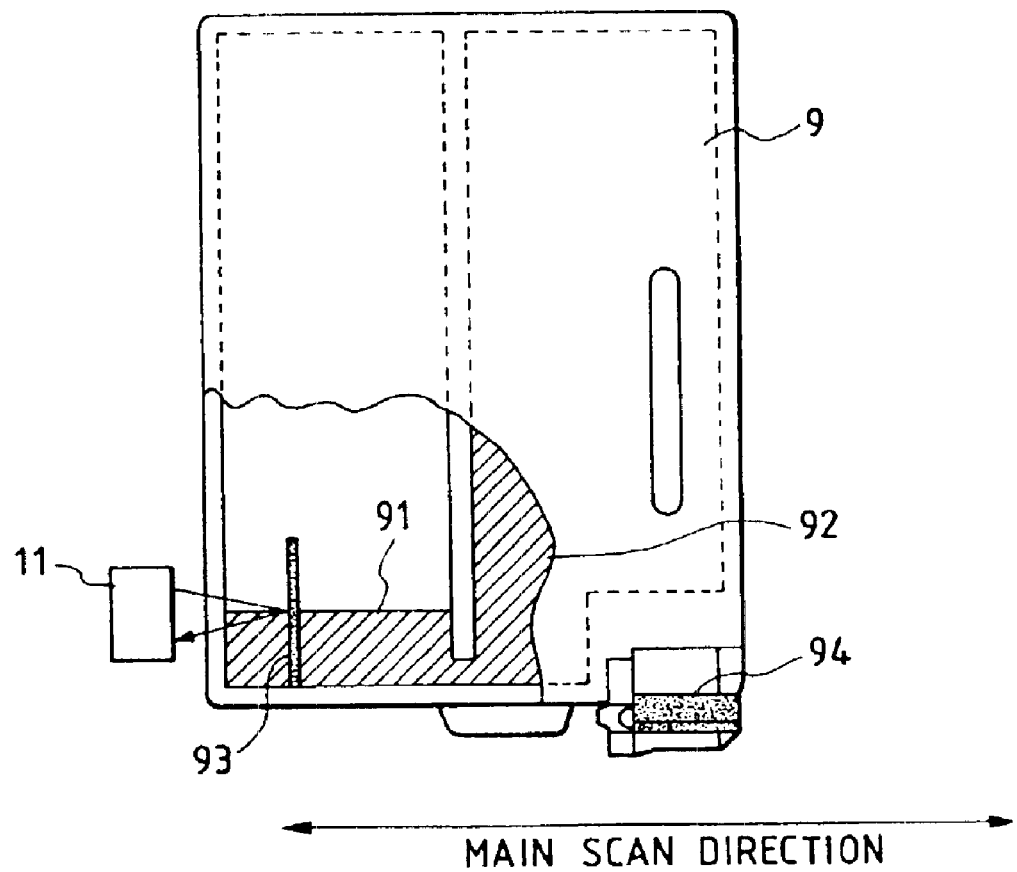
FIG. 11 is a view showing the construction of an ink cartridge.

FIG. 11 is a partially broken away view showing in detail the constitution of an ink cartridge 9. In FIG. 5, numeral 11 denotes a reflection type photosensor (hereinafter referred to as a photosensor), numeral 91 denotes an ink, numeral 92 denotes a sponge, numeral 93 denotes a reflection plate for reflecting light from the photosensor 11, and numeral 94 denotes a recording head. In particular, FIG. 11 shows the state where the carriage 10 is still, and the ink cartridge 9 mounted thereon is also still. Accordingly, the liquid level of the ink 91 does not fluctuate, and is smooth.

As will be clear from FIG. 11, the reflection plate 93 is provided near the bottom face of an ink vessel, and close to an ink cartridge wall face on which the photosensor 11 is installed. This is because by providing the reflection plate 93 near the photosensor 11, the intensity of reflected light received by the photosensor 11 is enhanced, and the S/N ratio with the ink remaining amount detection is improved, when no ink is left. Then, it is needless to say that the spacing (for sensing) between the ink cartridge lateral face on which the photosensor 11 is installed and the reflection plate 93 should be a spacing (2 to 4 mm) from the relation between the surface tension of the ink and the water repellency of the ink to the wall and the reflection plate, to avoid the ink standing therein.

In this manner, even if the reflection plate 93 is provided, the spaces to the left and right of the reflection plate 93 are not separate cavities, but the reflection plate is only placed intermediately, with the spaces for reversing the ink actually provided on both sides of the reflection plate in communication through the plate.

By the way, if the ink 91 is filled in the ink cartridge 9, the photosensor 11 can not capture the reflected light from the reflection plate 93, because the ink 91 intercepts the light from the photosensor 11, so that the output current from the photosensor 11 becomes substantially zero. On the contrary, if the ink cartridge 9 has no ink, the photosensor 11 can capture the reflected light from the reflection plate 93, so that the photosensor 11 can output a current corresponding to its intensity of reflected light.

Next, the operation will be described below.

Figure 12:
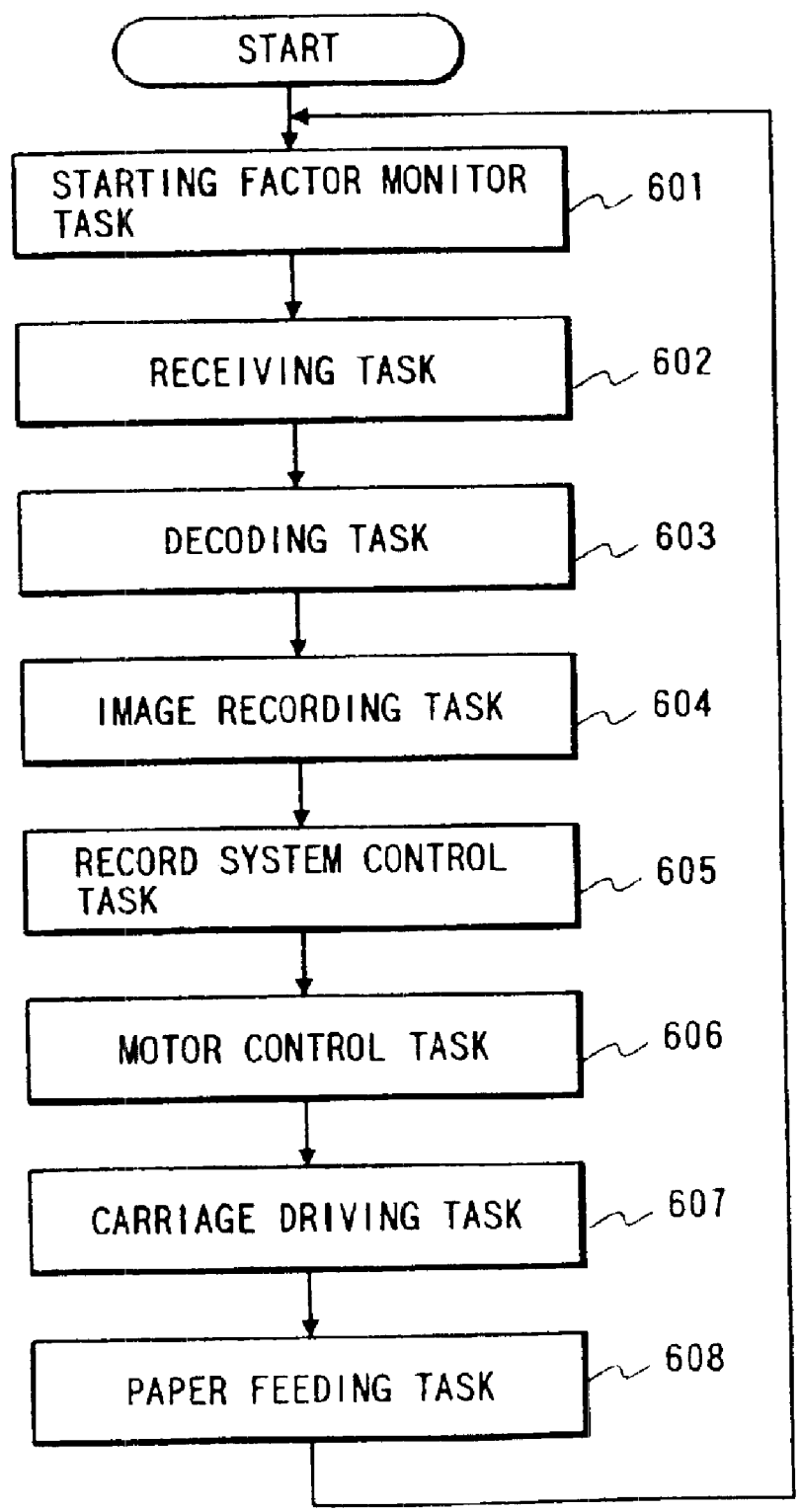
FIG. 12 is a control flowchart of the facsimile apparatus as shown in FIG. 7.

A software for controlling the operation of the present invention is composed of the following tasks (FIG. 12). The software is stored within the ROM 102, and executed by the CPU 101.

This software consisting of a starting factor monitor task (601) for starting a receiving task, a receiving task (602) for receiving operation, a decode task for decoding the received data, an image recording task (604) for recording the image, a recording system control task (605) for effecting the paper feeding and the transfer of data for recording, a motor control task (606) for controlling the recording system motor, a carriage drive control task (607) for controlling the driving of the carriage for the ink jet head, a paper feeding task (608) for feeding the recording sheet, and an ink check task (hereinafter described in greater detail) under the interrupt control for every 5 msec.

In this embodiment, each task is terminated every 5 msec, and the next task to be started is executed. Thereby, the more effective parallel processing can be implemented.

Figure 13:
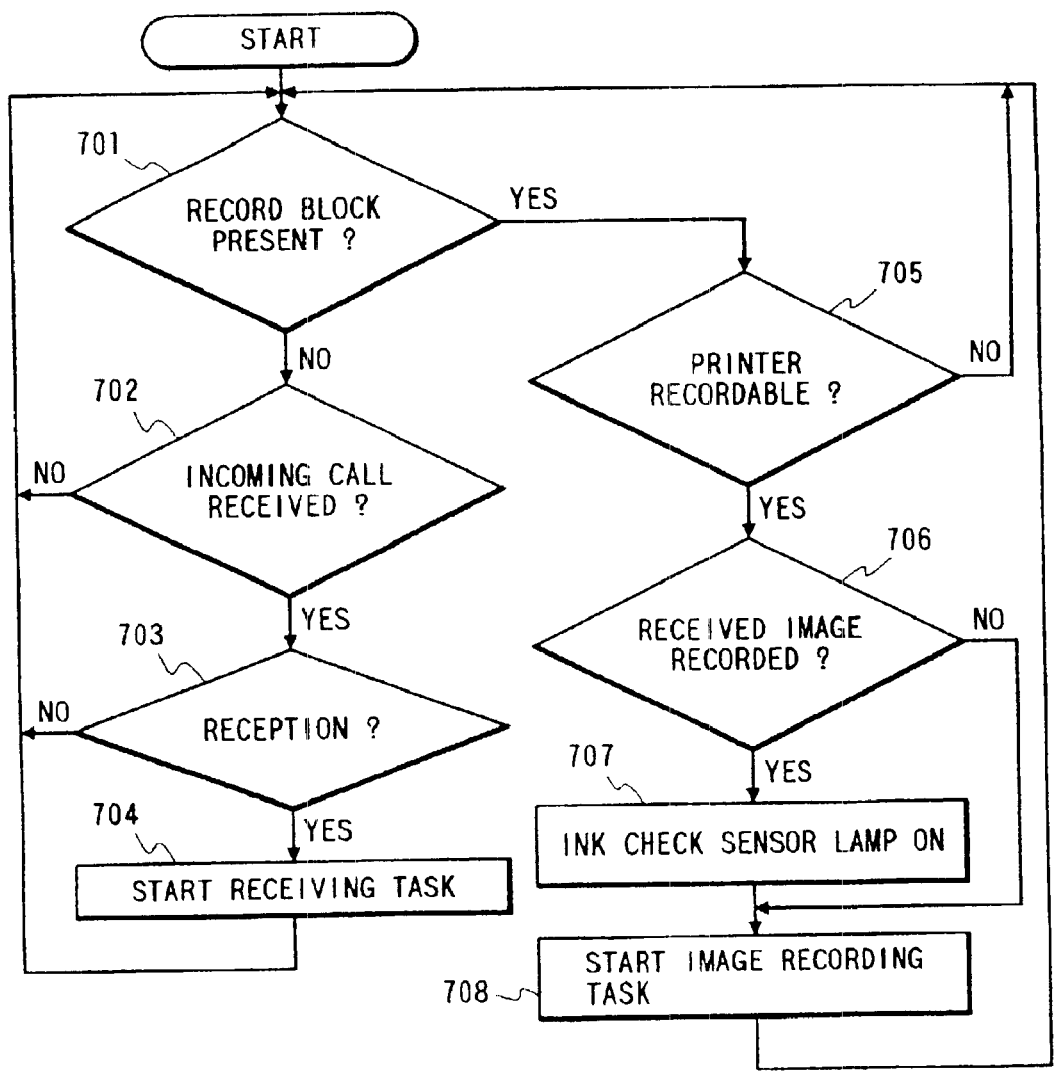
FIG. 13 is a flowchart showing a starting factor monitor task.

Referring now to FIG. 13, the starting factor monitor task will be described. The starting factor monitor task monitors the starting factors of the receiving task and the received image recording task.

The CPU 101 determines whether there is any record block to be recorded within the image buffer 201 of the RAM 103, based on whether the record block flag is set in the work area 207 (701).

If no record block exists, the CPU 101 monitors the incoming call to be received (702). If there is no incoming call, this task is ended. On the other hand, if there is any incoming call, then the CPU 101 determines whether data is received (703). If no data is received, this task is ended. If data is received, the receiving task is started (704), and this task is ended.

On the other hand, if there is any record block to be recorded within the image buffer 201 in the RAM 103, the CPU 101 determines whether the printer is ready for recording, based on the printer error flag in the work area 207 (705). The conditions where the printer is ready for recording are such that an ink cartridge is mounted, the ink exists within the ink cartridge, and the recording sheet cover 17 (FIG. 10) is closed. If the printer is ready for recording, the CPU 101 determines whether the received image is recorded (706). If the received image is recorded, a light source of the photosensor 11 (FIG. 11) for ink check is lit up (707). The reason why the light source of the photosensor 11 is lit up herein is that the light source should be stable at the timing of ink check, because it takes about 500 msec until the light source of the photosensor becomes stable. Also, if the light source is continuously lit up, without regard to the transmission and receiving, the light source is significantly deteriorated, and therefore the light source is lit up only when necessary, to assure a longer life of the light source. Since the light source is lit up only when necessary, the consumption of power can be reduced. When recording the image in the copy mode or print mode in which the operator is present at the side of the apparatus, the light source is not lit up to perform the ink check, and thereby also is assured of having a longer life. Herein, since there is merit in that the operator is rapidly informed that the ink is used up by performing the ink check in the print mode or copy mode, the sensor for ink check may be turned on in performing the recording.

If the sensor for ink check is turned on, then the image recording task is started (708), and this task is ended.

On the other hand, if the printer is not ready for recording (705), the memory receive task is started to accumulate the image data arriving in the image buffer 201 within the RAM 103, because the image can not be recorded. The memory receive task is started, and then this starting factor monitor task is ended.

The starting factor monitor task is given a time of 5 msec for processing by the timer 10106 within the CPU 101. If the processing of this task is not ended after the elapse of 5 msec, the steps and variables that have been executed are once stored in a stack area (not shown) within the CPU, and the next task is executed. The remainder of the starting factor monitor task is performed when the starting factor monitor task is given a time for processing later.

Figure 14:
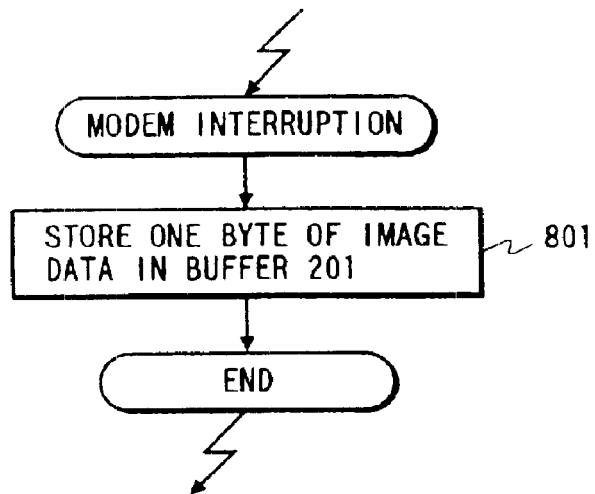
FIG. 14 is a flowchart showing an receiving interrupt process.

Next, the receiving operation will be described below using FIG. 14.

The model 111 receives image data from the telephone line, in which an interruption is generated to the interrupt processor 10103 in the CPU 101, every time received data amounts to 1 B (byte). If an interruption occurs, the CPU 101 temporarily stores data in the image buffer 201 within the RAM 103.

Figure 15:
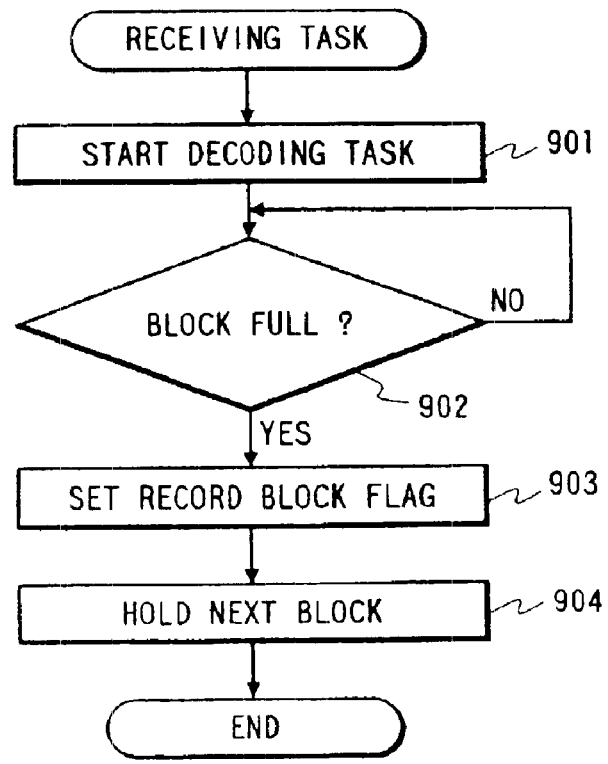
FIG. 15 is a flowchart showing a receiving task.

Referring now to FIG. 15, the receiving task will be described.

The receiving task is started by the starting factor monitor task. Then, the decode task is started (901) to count the number of data within a received block. The CPU 101 determines whether or not one block (4 KB) is full, based on a block counter in the work area 207 (902). If one block is full, the management information is created in a block management area in the work area 207, and the record block flag is set (903), and then the process for holding the next block (904) is performed.

The receiving task is given a time of 5 msec for processing by the timer 10106 within the CPU 101. If the processing of this task is not ended after the elapse of 5 msec, the steps and variables that have been executed are once stored in a stack area not shown within the CPU, and the next task is executed. The remainder of the receiving task is performed when the time for the next receiving task is allowed.

Figure 16:
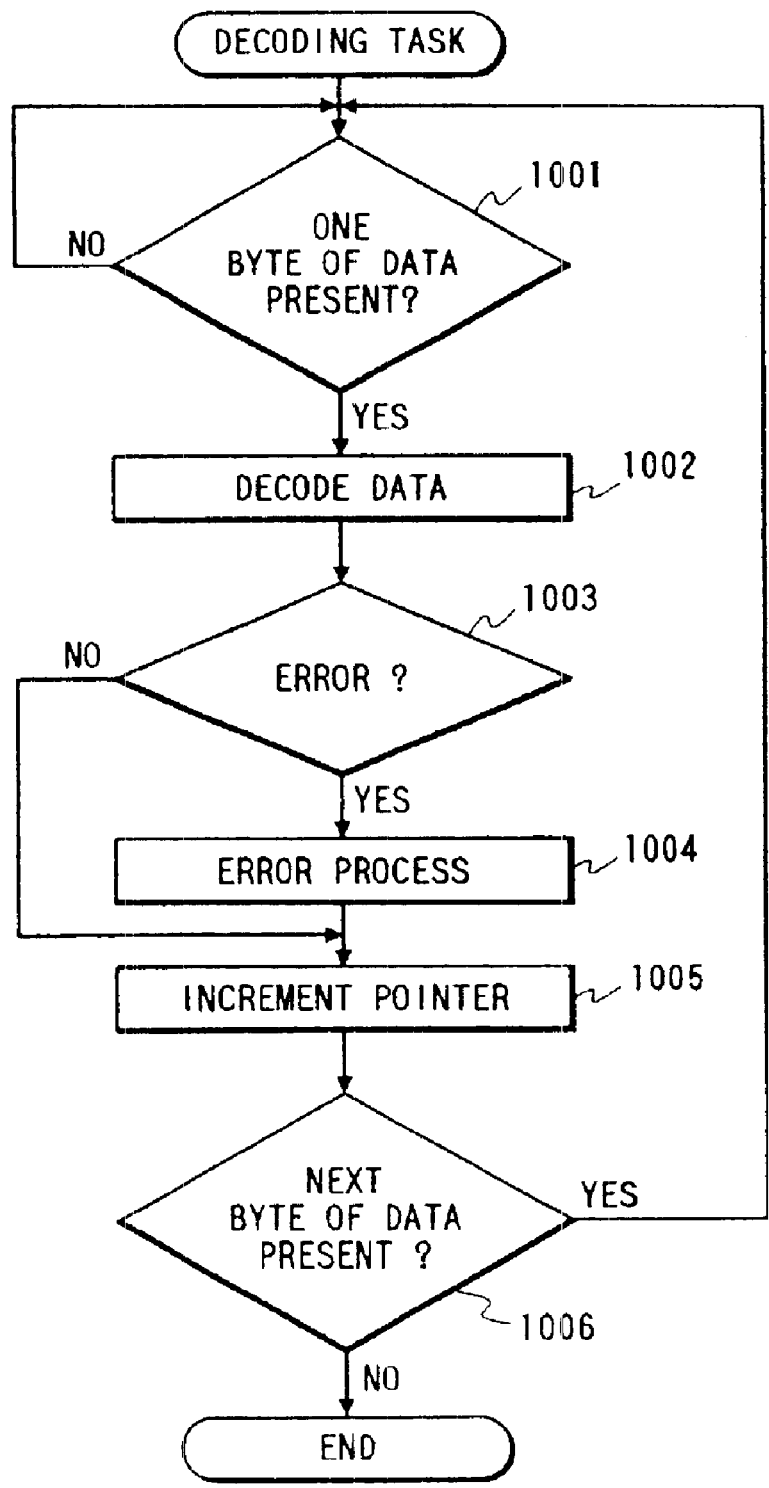
FIG. 16 is a flowchart showing a decoding task.

Referring now to FIG. 16, the decode task will be described. The decode task checks to see whether or not there is any error due to circuit noise in the received image data by means of the soft codec 10105 within the CPU 101.

First, the CPU 101 determines whether or not there is received data of one byte within the image buffer 201, based on the content of a receive counter indicating the memory write location of received image in the work area 207 (1001). If there is no received data of one byte, the decode task is ended. On the other hand, if there is any received data of one byte, data in the image buffer 201 indicated by the receive counter is read out and decoded into the run-length data by the soft codec 10105 (1002). Then, the CPU 101 determines whether the data of one line has a predetermined length by accumulating the run-length data and comparing it with the value of an error check counter within the work area 207, and whether there is any error (1003). If there is any error, an error processing is performed by replacing the error line with data of the previous line, or full-white data. If there is no error, or the error processing is ended, the initial value of the decode counter in the work area 207 is set at a value of receive counter, the decode counter is incremented (1005), and the CPU 101 determines whether there is any data of next byte by comparing the value of the receive counter with that of the decode counter (1006). If there is no data of next byte, this task is ended. On the other hand, if there is any data of next byte, the same processing is repeated until the data of next byte does not exist.

Herein, the decoding task is given a time of 5 msec for processing by the timer 10106 within the CPU 101. If the processing of this task is not ended after the elapse of 5 msec, the steps and variables that have been executed are once stored in a stack area (not shown) within the CPU, and the next task is executed. The remainder of the receiving task is performed when the time for the next receiving task is allowed.

Note that the decoded data is only used for the error check, and then discarded.

Referring now to FIGS. 17A and 17B, the image recording task will be described. The image recording task is started by the starting factor monitor task. If the image recording task is started, then the recording system control task is started (1101). Then, the image to be recorded in the image buffer (201) within the RAM 103 is held by one block (4 KB). This is performed in accordance with the information of block management area within the work area 207.

Then, the CPU 101 determines whether the recording system has troubled, based on the printer error flag (1103). This error of the recording system may be that the ink is used up, cover 17 (FIG. 10) is in an opened state, there is no paper, there is a paper jam, or no cartridge mounted. The sensors thereof are connected at the port 11003 of the gate array 110.

If there is no error in the recording system, the CPU 101 determines whether the receive buffer 203 within the RAM 103 is vacant, by comparing the value of the receive buffer write position counter with that of the receive buffer read position counter (1104). If it is not vacant, the CPU 101 waits for the receive buffer to be vacant. If it is vacant, the CPU 101 determines whether the number of copies for the image to be recorded is only one (1105). This is performed because if the number of copies is only one, the image data in the image buffer 201 is raw image data, and is unnecessary to decode. On the other hand, if the image is received image or the number of copies is more than one, the image is compressed image data, and is required to be decoded.

If the image for output is received image for which the number of copies is not one, or the image for which the number of copies is more than one, the data within the image buffer 201 is read out with the decode counter 2 in the work area 207, and decoded into the run-length code by the soft codec unit 10105 of the CPU 101 (1106). The decoded run-length code is written successively into the run-length buffer 202 pointed to by an RL buffer pointer in the work area 207.

If the run-length code is written into the run-length buffer 202 after decoding of one line, or the number of copies is equal to one, the CPU 101 determines whether the decoding of one line is ended (1107). If the decoding of one page is ended, or for one copy, if the buffer is full, but not in units of pages, the CPU 101 determines whether the data of one line is full-white data (1108). If so, a white skip command is set in the parallel/serial converter 11007 of the gate array (1121). On the other hand, if not, a raster image command indicating the raster image is set in the parallel/serial converter 11007 of the gate array 111 (1109). Subsequently, the run-length code in the run-length buffer 202 is set in the RL/raw image converter 11006 of the gate array 111 (1110). The white skip command or raster image command set in the parallel/serial converter 11007 is passed through the resolution converter 11008 into the receive buffer 203 within the DRAM 103 (1111), the receive buffer write location counter being incremented. Then, the resolution converter 11008 makes no conversion for the command. Subsequently, the run-length code entered into the R/L raw image converter 11006 is converted into the raw image data and entered into the resolution converter 11008. The resolution converter 11008 converts the received image of 8 pel into the image of 360 dpi in the main scan direction. The converted image data is transferred to the receive buffer 203 (1111), the receive buffer write location counter being incremented. These processings are repeated until one block is completed (1112). If there is any block to be held, the above-mentioned processings are repeated. The block management thereof is performed in the block management area.

Herein, if any error occurs in the recording system at step 1103 (1103), the recording system control task is ended (1114). Then, the memory receiving task is started (1115), and this image recording task is ended.

At step 1107, if the end of page occurs, the record block held is released (1113), and image data of one page within the image buffer 201 is cleared (1116). Subsequently, a page end command is set in the parallel/serial converter 11007 of the gate array 111 (1117). The command set in the parallel/serial converter is passed through the resolution converter 11008 to the receive buffer 203, the receive buffer write location counter being increment.

Then, the CPU 101 determines whether or not the data processing for all pages is ended, based on the content of the block management area (1118). If the data processing for all pages is not ended, the operation returns to step (1102). On the other hand, if the processing for all pages is ended, the recording control task is ended (1119). Further, the light source for the sensor 11 for ink check is turned off (1120), the image recording task is ended. Herein, the reason why the light source for the sensor 11 for ink check is turned off is that the aging deterioration of the light source is prevented and the consumption power is reduced.

Herein, the image recording task is given a time of 5 msec for processing by the timer 10106 within the CPU 101. If the processing of this task is not ended after the elapse of 5 msec, the steps and variables that have been executed are once stored in a stack area not shown within the CPU, and the next task is executed. The remainder of the image recording task is performed when the time for the next receiving task is allowed.

Figure 18:
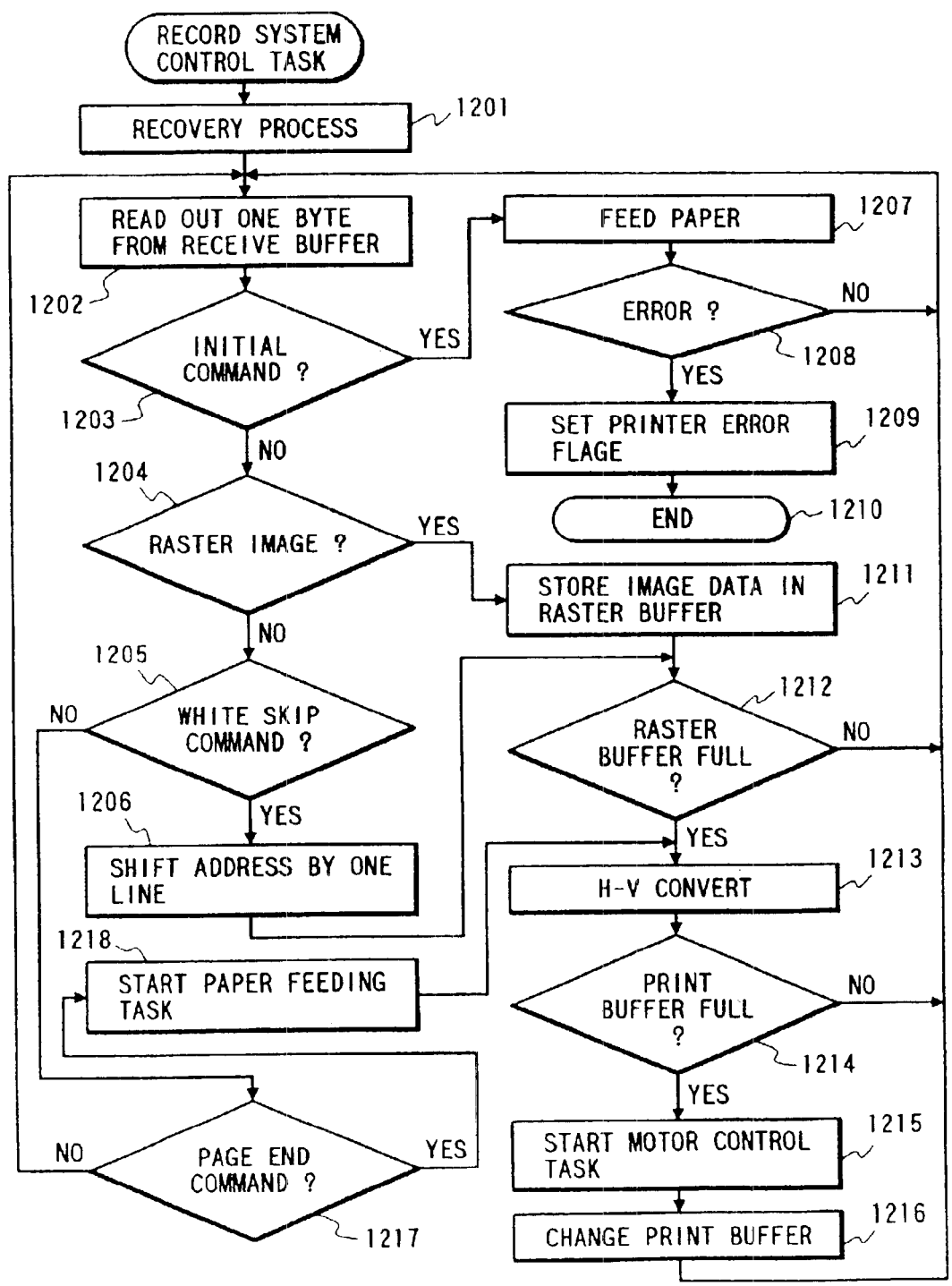
FIG. 18 is a flowchart showing a recording control task.

Referring now to FIG. 18, the recording system control task will be described.

The recording system control task is started by the image recording task. If the recording system control task is started, the CPU 101 first monitors the time of recovery, and subjects the ink jet recording head 9 (FIG. 10) to recovery operation if the time since the previous recovery operation is greater than a predefined time (1201).

The recovery operation is an operation for recovering or restoring the ink discharge orifices which may be clogged with the dust or ink fixed due to drying into usable condition by sucking the ink from the outside using a pump.

If the recovery operation is performed, then data of one byte is read out from the receive buffer 203 (1202), the receive buffer reading location counter being incremented. Then, the CPU 101 determines whether or not read data of one byte is an initial command (1203). If so, the recording sheet is fed (1207). Then, the CPU 101 determines whether or not there is any error such as jam of recording sheet or no recording sheet in the reader (1208). If there is any error in the recorder, the printer error flag in the work area 207 is set (1209). This error flag is detected at step 705 of the starting factor monitor task (FIG. 13) or at step 1103 of the image recording task (FIG. 17A). If the printer error flag is set, this task is ended (1210). On the other hand, if there is no error, the operation returns to step 1202.

If read data of one byte is not an initial command (1203), the CPU determines whether or not it is a raster image (1204). This is determined based on whether or not it is a raster image command.

If it is the raster image, an image of one byte is stored in the raster buffer (1211), the receive buffer write location counter being incremented. If it is the raster image, the image data of one byte is stored in the raster buffer 204 (1211). Herein, the work area 207, there is provided a raster buffer counter for counting the number of lines stored in the raster buffer 204.

The CPU 101 determines whether or not the count value of the raster buffer counter reaches 8, every time data of one line is stored in the raster buffer 204 and after the raster buffer counter is incremented. The transfer of data from the receive buffer 203 to the raster buffer 204 is continued, until the count value of the raster buffer counter reaches 8. And if the count value of the raster buffer counter reaches 8 (1212), the transfer of data from the receive buffer 203 to the raster buffer 204 is interrupted, and the data within the raster buffer 203 is H-V converted successively from the left end (1213), and the resulted data is stored in the print buffer 1 (205). In the work area 207 of the RAM, there is provided an H-V conversion execution counter for counting the number of H-V conversions that have been executed, and the CPU 2 determines whether the count value of this counter reaches 8, after this counter is incremented every time H-V conversion for the data of 8 lines is performed. The transfer of data of 8 lines from the receive buffer 203 to the raster buffer 204 and from the raster buffer 204 to the print buffer 1 (205) is repeated, until the count value of the H-V conversion counter reaches 8, that is, the storage of data of 64 lines is ended (1214). Herein, since the H-V conversion counter only needs to count a count value of not greater than 8, this counting is much simpler than counting the number of data for one main scan (64×3640).

If the count value of H-V conversions reaches 8, the CPU 101 starts a motor control task for recording the data at the first scan stored in the print buffer 1 (1215).

If read data of one byte is not the raster image (1204), then the CPU determines whether or not it is a white skip command (1205). If it is the white skip command, the address (raster buffer counter) of the raster buffer 204 for storing the image data is shifted by one line (1206). And it is checked whether data of 8 lines is prepared in the raster buffer 204.

At step 1205, if the data is not the white skip command, it is determined whether or not it is a page end command (1217). If it is the page end command, the H-V conversion of image data remaining in the raster buffer 204 is performed at step 1213, because the transfer of image data of one page is ended, and the above-described processings are repeated. If it is not the page end command, the operation returns to step 1202.

Herein, the recording system control task is given a time of 5 msec for processing by the timer 10106 within the CPU 101. If the processing of this task is not ended after the elapse of 5 msec, the steps and variables that have been executed are once stored in a stack area not shown within the CPU, and the next task is executed. The remainder of this task is performed when the time for the next receiving task is allowed.

Figure 19:
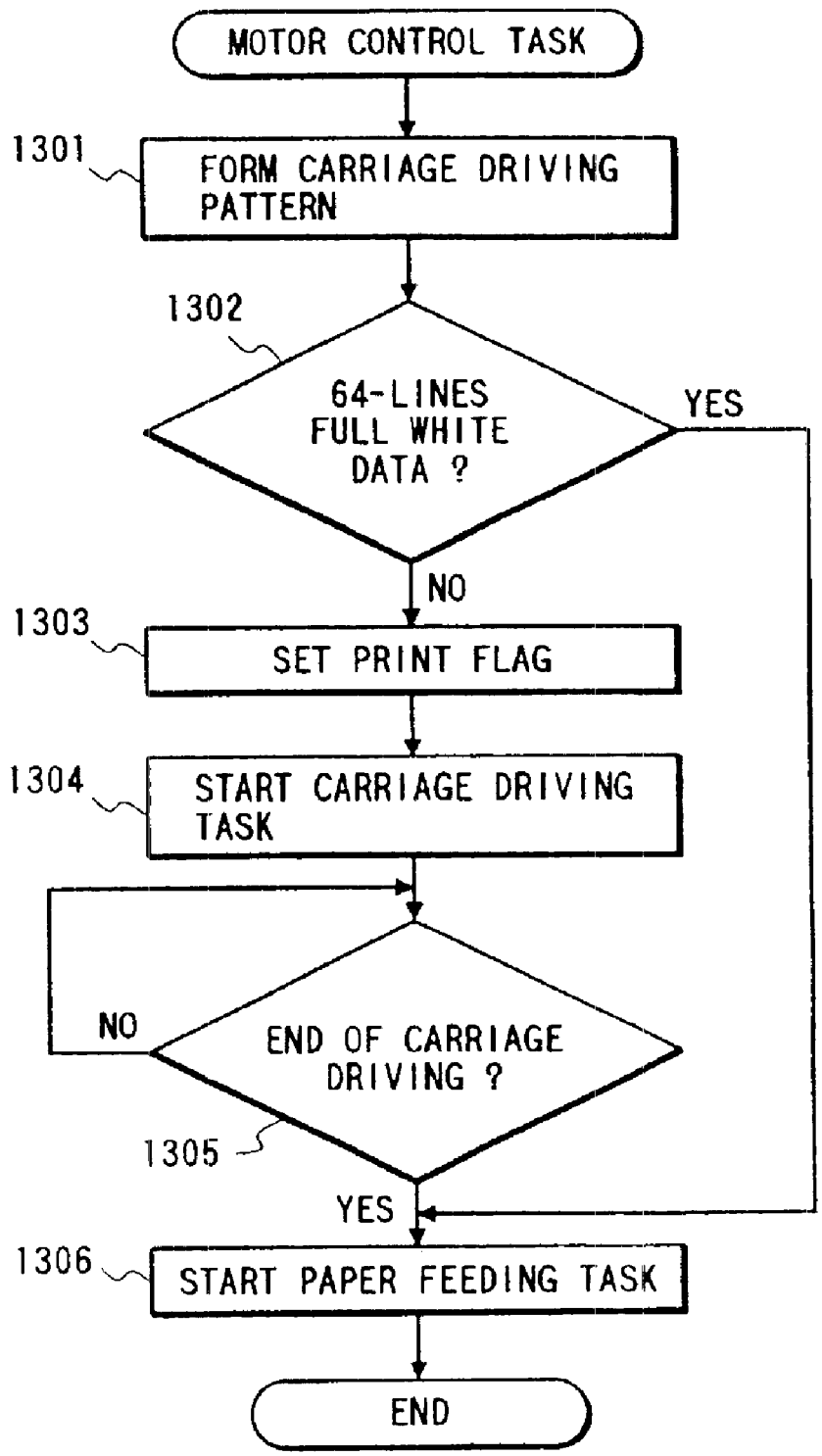
FIG. 19 is a flowchart showing a motor control task.

Referring now to FIG. 19, a motor control task will be described.

Figure 22:
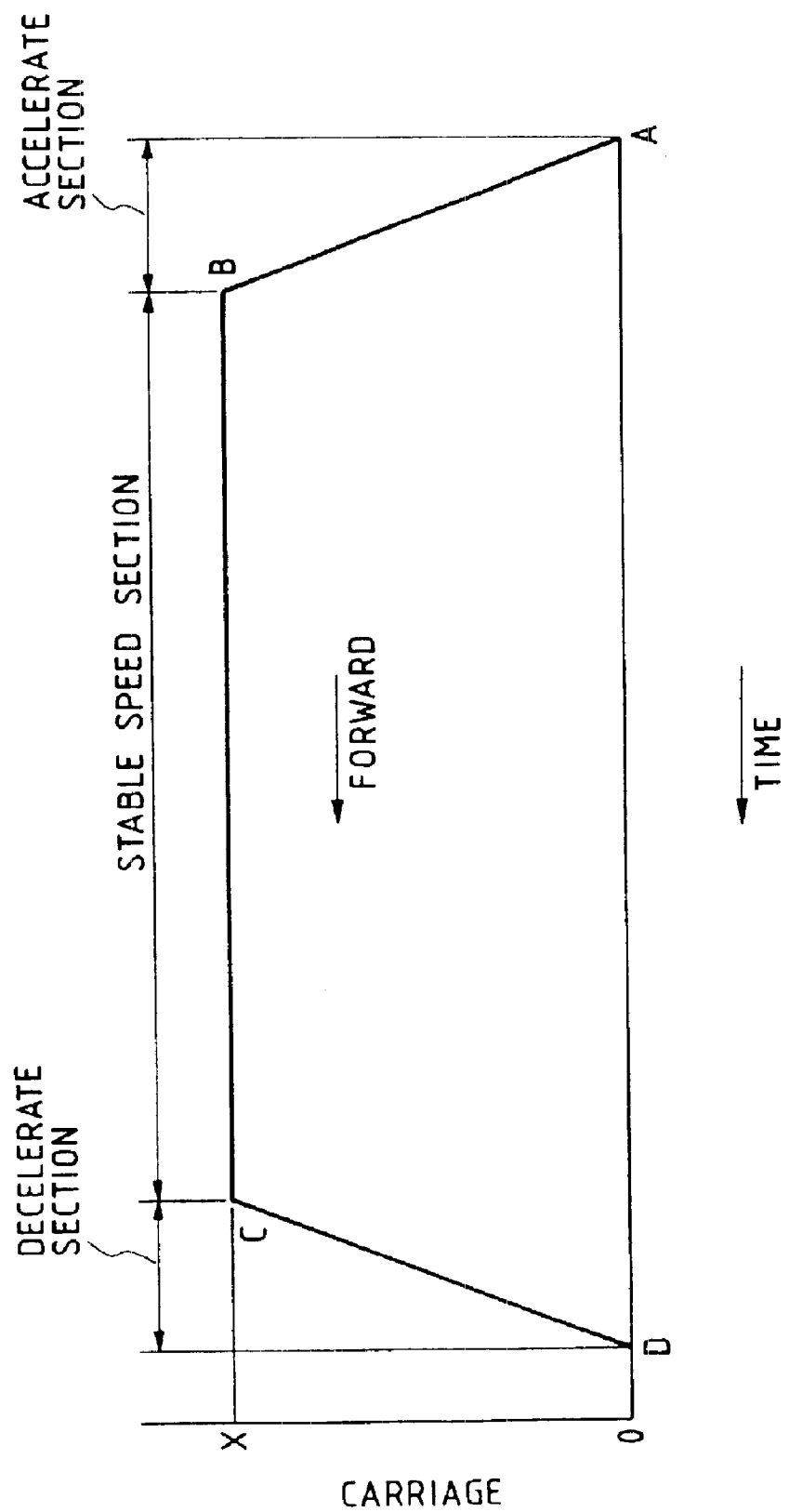
FIG. 22 is a chart showing the variation of carriage moving speed.

The CPU 101 predetects from which address and how wide the print area with black data among the data stored in the print buffers 205, 206 extends prior to recording, and creates a drive pattern such as accelerate, decelerate, and stable speed (1301) (see FIG. 22). This is performed to prevent useless operation of the carriage which may occur when the carriage is driven beyond the print data area. The drive pattern of the carriage is created by fast operation of the SRAM 10101 in the CPU 101. The created drive pattern is stored in a carriage drive pattern area of the work area 207.

Then, the CPU determines whether or not the data stored in the print buffer 205 or 206 is full-white data for all 64 lines (1302). If not, the print flag in the work area 207 is set (1303), and a carriage drive task is started (1304). This processing is performed until the end of carriage driving (1305). If the carriage driving is ended, a paper feeding task is started (1306).

Herein, the motor control task is given a time of 5 msec for processing by the timer 10106 within the CPU 101. If the processing of this task is not ended after the elapse of 5 msec, the steps and variables that have been executed are once stored in a stack area not shown within the CPU, and the next task is executed. The remainder of this task is performed when the time for this task is allowed later.

Figure 20:
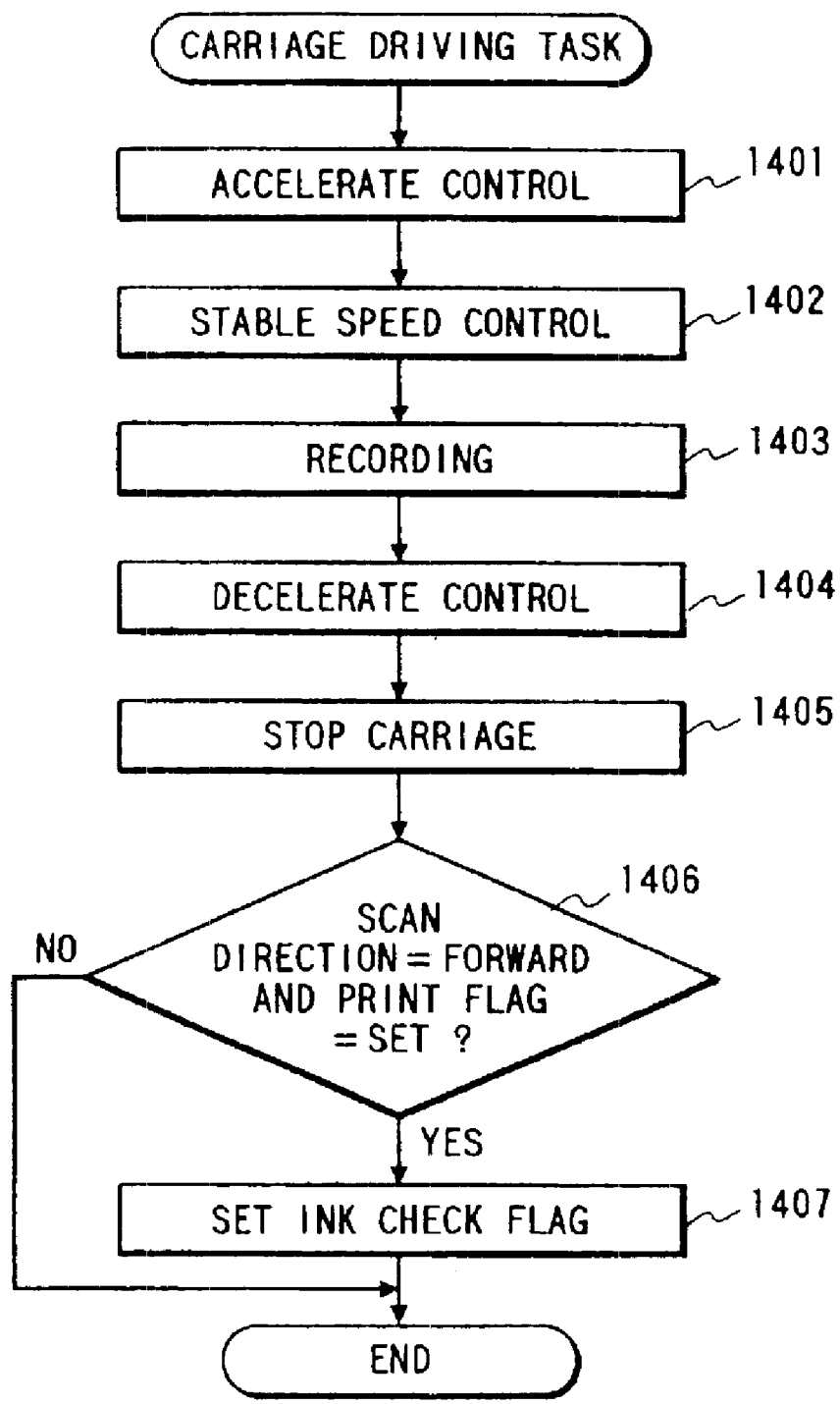
FIG. 20 is a flowchart showing a carriage control task.

Referring now to FIG. 20, a carriage drive task will be described.

The carriage drive task is started by the motor control task. If the carriage drive task is started, the CPU 101 first makes the accelerate control in accordance with a drive pattern of carriage (see FIG. 22) created by the motor control task (1401). If the accelerate control is ended, the CPU 101 makes stable speed control in accordance with the drive pattern of carriage (see FIG. 22) created by the motor control task (1402), and performs the recording operation (1403).

Herein, the print buffer 205, 206 has its address in the one-to-one relation with the location in the scan area scanned by the recording head 210. Also, the position of the recording head 9 is determined based on the count value of a carriage driving counter in the work area 207 for counting the number of pulses supplied to the carriage driving pulse motor 308, with reference to a home position not shown. That is, when the carriage is moved in a direction away from the home position, the count value of the carriage driving counter for counting the number of pulses supplied to the carriage driving pulse motor 308 is incremented, while when the carriage is moved in a direction back to the home position, the count value of the carriage driving counter is decremented in correspondence to the number of pulses supplied to the carriage driving pulse motor. Note that this counter 4 is provided in a predetermined area of the RAM 216. Based on this count value, the current position of the recording head 210 can be detected.

After issuing of a recording start signal, the recording head 9 is moved from the home position, and upon detecting that the recording head has arrived at a position corresponding to the first column location of black data, the data stored in the print buffer 1 is read out successively every 64 dots from this location, and the recording at the first scan is performed by driving the ink discharge heaters of the recording head 9 in accordance with the data in the print buffer. In a predefined area of the work area 207, a recording width counter for setting the number of columns corresponding to the width of black data is set, and decremented every time the data is read out from the first column location where black data reside, and recorded. This count operation can be made by counting the pulse signal in accordance with the number of pulses supplied to the carriage driving pulse motor. And if the count value of this recording width counter becomes zero, the end of the first scan is determined, and the recording head is stopped at that position. And upon the end of the first scan, the recording sheet conveying motor is driven to feed (sub-scan) the paper a length corresponding to the recording width of the recording head 210.

During the recording of data at the first scan, data at the second scan is transferred from the receive buffer 203 to the print buffer 206 and stored in the same manner as data at the first scan transferred. Accordingly, if the data at the second scan has been already stored in the print buffer 2 (206)

before the end of the first scan, the print buffer 2 (206) is switched for reading of data and the print buffer 1 (205) for storage of data at the time when the first scan is ended, the data is read out from the print buffer 2 (206) and recorded for the second scan in the same manner as at the first scan, and then the data at the third scan is stored in the print buffer 1 (205).

If data at the second scan is not stored in the print buffer 2 (206) at the time when the first scan is ended, the recording head 9 waits at the print end position of the first scan until the data at the second scan is prepared in the print buffer 2. Also, if a predetermined time (e.g., 2 seconds) has elapsed during waiting, the recording head 9 once returns to the home position. And if data at the second scan is prepared, the print buffer 2 (206) is switched for reading of data and the print buffer 1 (205) for storage of data, and the data is read out from the print buffer 2 (206) and recorded for the second scan. Also, while the recording is performed for this second scan, data at the third scan is stored in the print buffer 1 (205). And the paper is fed correspondingly to a recording width of the recording head 210 upon the end of the second scan.

In this manner, the above-described operation is repeated while the print buffers 1, 2 are alternately switched between two modes for reading (recording) of data and for storage of data to record the image of one page.

As previously described, the facsimile apparatus in this embodiment predetects and memorizes in the RAM from which location and how wide the black data resides among data stored in the print buffer 1 (205) or 2 (206) (see step 1301).

Accordingly, in starting the next main scan after the end of the current main scan, the print start position of the next main scan is determined by referring to the recording end position of the current scan and the existence range of black data for the next scan, and assuming a position in the existence range of black data to which the carriage is moved a shorter distance from the recording end position to perform the recording.

However, where data contains any line such as the ruled line extending over two consecutive main scans, the ruled line may undergo discrepancy if the print direction is reversed for every main scan, and therefore the printing is controlled to take place in the same direction, despite the recording end position and the print range of the next main scan.

If the reading of data from the print buffers 205, 206 is ended, the decelerate control is performed (1404), and the carriage is stopped (1405). In this case, the CPU determines whether the scan direction of carriage is forward or not, based on a scan direction flag within the work area 207, and whether the print flag is set (1406). Herein, the CPU determines whether to perform the ink check process. The ink check process other than during the printing will take a wasteful processing time, decreasing the throughput of the system. Also, if the scan direction of carriage is reverse, no ink check is performed because the false detection may occur due to a reason as will be described later.

If the scan direction is not forward or the print flag is not set, this task is ended.

On the other hand, the scan direction is forward and the print flag is set, the ink check flag is set and this task is ended.

Herein, the carriage driving task is given a time of 5 msec for processing by the timer 10106 within the CPU 101. If the processing of this task is not ended after the elapse of 5 msec, the steps and variables that have been executed are once stored in a stack area not shown within the CPU, and the next task is executed. The remainder of this task is performed when the time for this task is allowed later.

Figure 21:
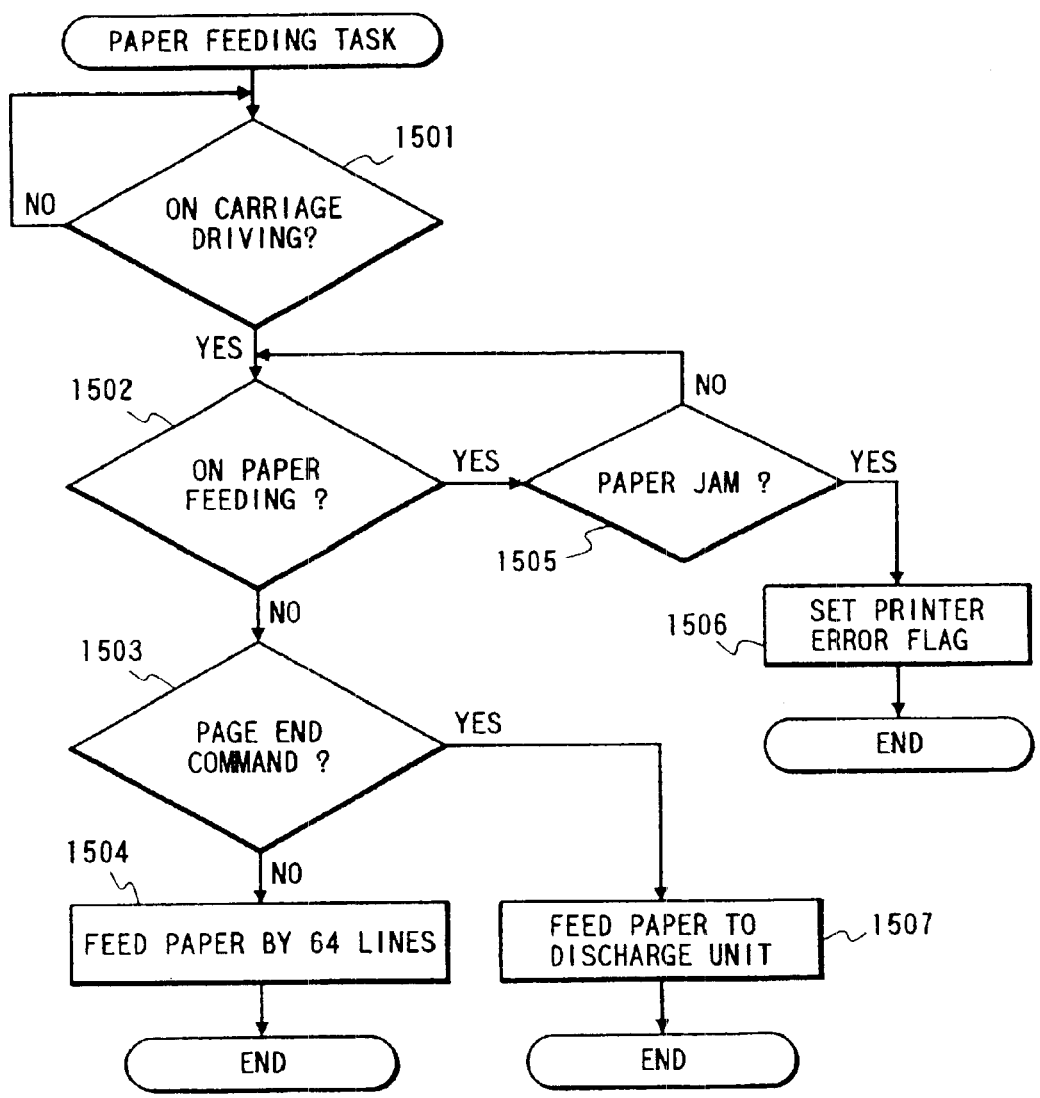
FIG. 21 is a flowchart showing a paper feeding task.

Referring now to FIG. 21, a paper feeding task will be described.

The paper feeding task is started by the motor control task. If the paper feeding task is started, the CPU determines whether the carriage is on driving (1501). If the carriage is on driving, the carriage is not driven because the print data may be disturbed. Then, the CPU determines whether the paper is already on feeding (1502), and whether the command is a page end command (1503). If it is not the page end command, the paper is fed by 64 lines which is the number of nozzles in the sub-scan direction (1504) to prepare for the next print, and this task is ended. On the other hand, if it is the page end command, the recording sheet is exhausted into the paper exhaust unit (1507), and this task is ended. At step 1502, if the paper is already on feeding, the CPU determines whether the paper is jammed (1505). If the paper is not jammed, the paper is fed until the end of paper feed, while if the paper is jammed, the printer error flag is set (1506), and this task is ended.

Herein, the paper feeding task is given a time of 5 msec for processing by the timer 10106 within the CPU 101. If the processing of this task is not ended after the elapse of 5 msec, the steps and variables that have been executed are once stored in a stack area not shown within the CPU, and the next task is executed. The remainder of this task is performed when the time for this task is allowed later.

Next, the ink check process will be described. The details of ink remaining amount detection are described.

The ink remaining amount can be detected, using a reflection plate 93 and a photosensor installed inside an ink cartridge as shown in FIG. 11, based on the intensity of light which is emitted from the photosensor 11, reflected from the reflection plate 93, and received by the photosensor 11 again. By the way, as shown in FIG. 8, both the photosensor 11 and the reflection plate 93 are provided along a reciprocating direction (main scan direction) of the carriage 10, and a sensor light receiving plane and a reflection plane thereof are disposed perpendicular to the main scan direction.

FIG. 22 is a chart showing the variation of moving speed when the carriage 10 is moved. In particular, FIG. 22 shows the variation of speed where the recording head performs the recording, i.e., where the carriage 10 makes the forward scan (this direction is referred to as a forward direction). The moving speed of carriage 9 with the ink cartridge 9 mounted thereon is varied such as from point A to point B to point C to point D as sown in FIG. 13, when scanning in the forward direction.

That is, the range from point A to point B is an acceleration section where the carriage 10 located at the home position is accelerated at a predetermined acceleration from the rest state, with its moving speed reaching a predetermined speed (X) and becoming stable (referred to as a ramp-up). The range from point B to point C is a stable speed section where the carriage 1 is moving at a stable speed (X) for the recording. The range from point C to point D is a decelerate section where the carriage 10 with the recording head mounted after recording is decelerating at a predetermined negative acceleration from the speed (X) and stopped (referred to as a ramp-down).

Figure 23:
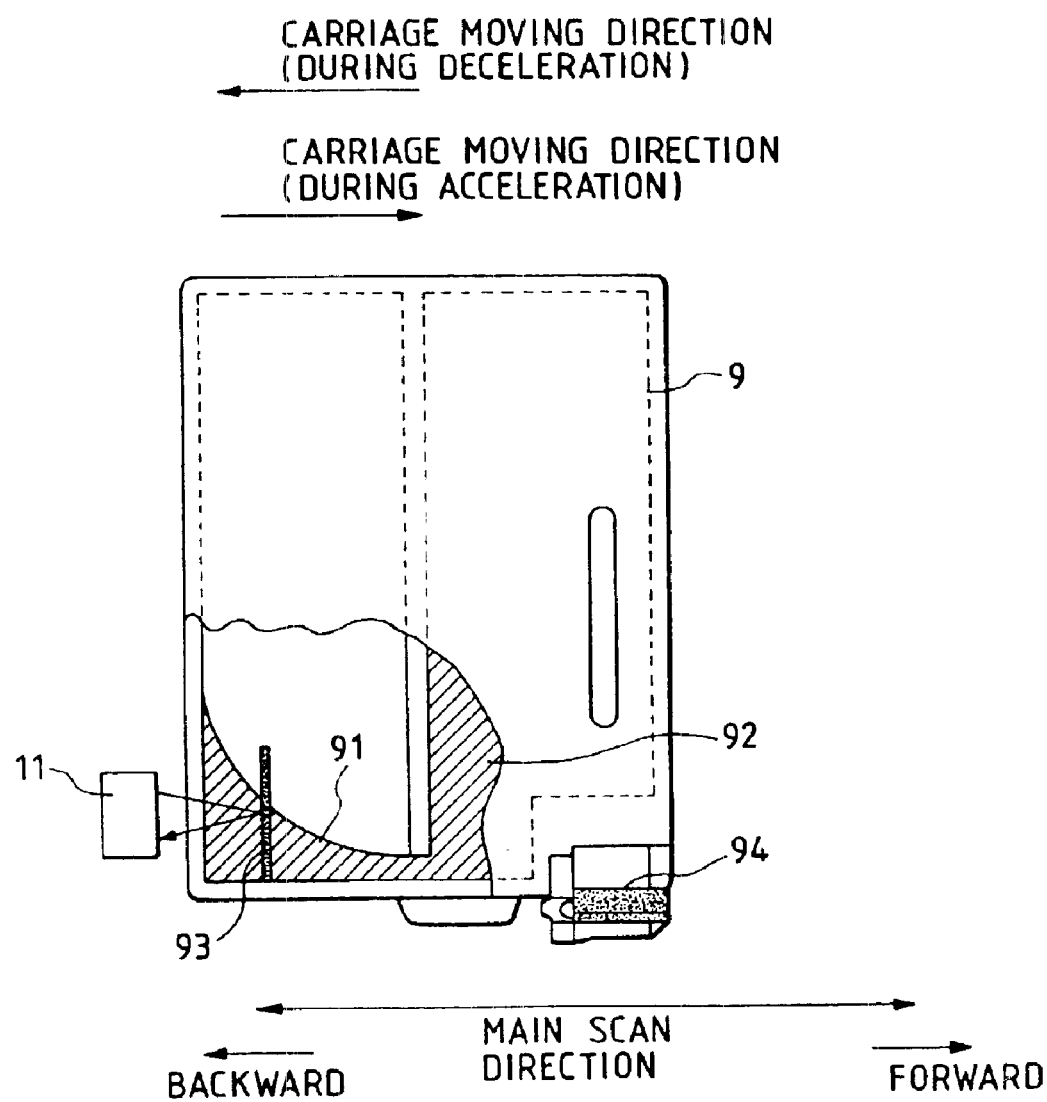
FIG. 23 is a view showing the liquid level of ink within the cartridge during the movement of carriage.
Figure 24:
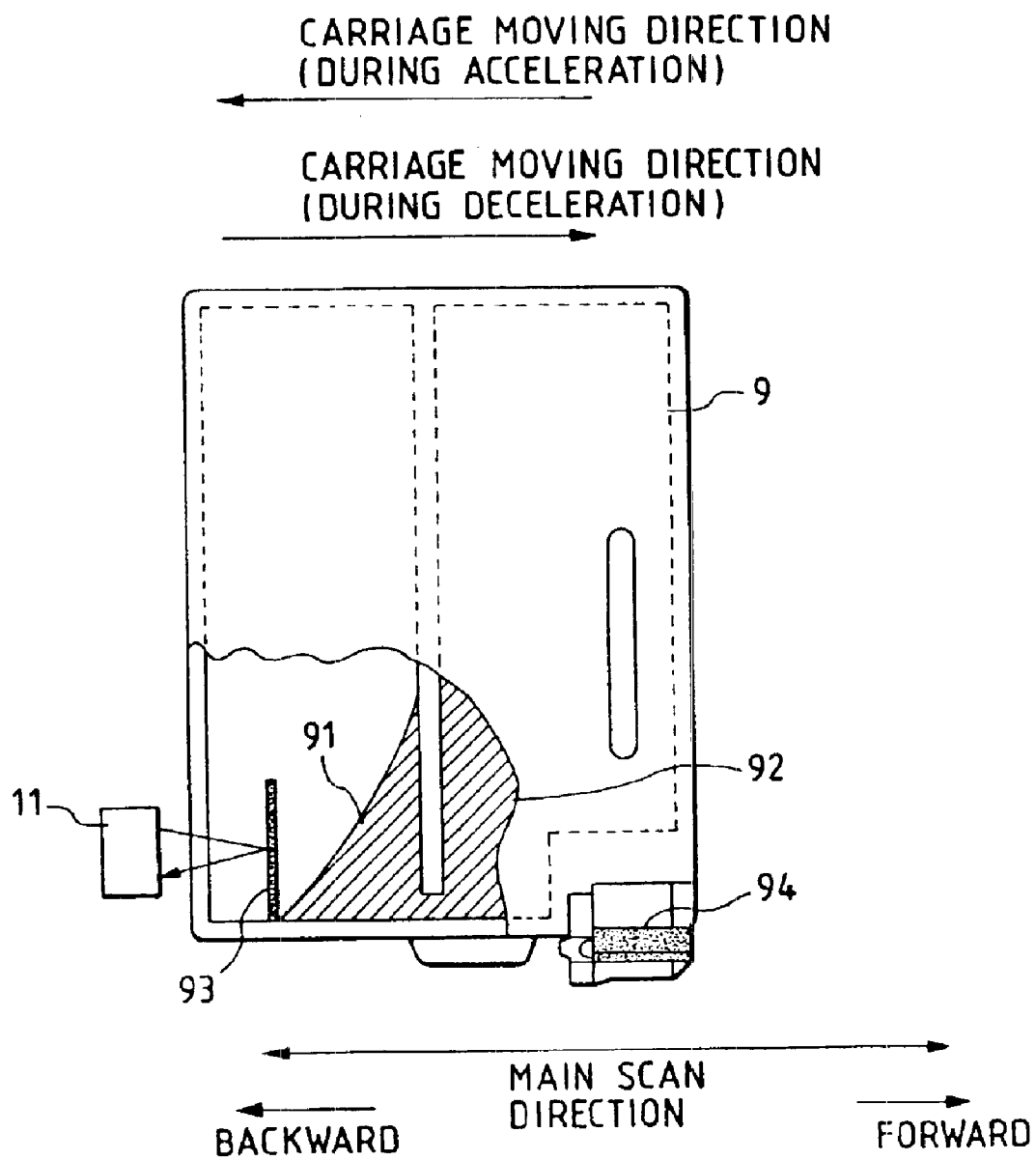
FIG. 24 is a view showing the liquid level of ink within the cartridge during the movement of carriage.

In this manner, as the carriage 10 is moved, the ink cartridge 9 is subject to acceleration (inertial force). Namely, in the acceleration section from point A to point B in the forward movement (forward scan) and during deceleration in the reverse direction (backward scan), the ink liquid level of the ink cartridge 9 is as shown in FIG. 23. On the other hand, in the deceleration section from point C to point D in the forward movement (forward scan) and during acceleration in the reverse movement (forward scan), the ink liquid level of the ink cartridge 9 is as shown in FIG. 24. Note that when the carriage 10 is moving at stable speed or in the rest state, the ink liquid level of the ink cartridge 9 is as shown in FIG. 11, because the ink cartridge 9 is not subject to acceleration.

In this manner, the state at the ink liquid level of the ink cartridge 9 (more correctly, the gap between the side face of ink cartridge 9 on the side where the photosensor 11 is placed and the reflection plate 93) is varied with the movement of the carriage 10.

Therefore, it may be determined that the ink is empty at a certain timing, but that ink actually remains at another timing, with apparent variation of ink liquid level, even though the remaining ink amount is actually the same.

In view of these considerations, either of the following two controls is performed.

(1) By detecting the ink remaining amount at each of the above three states while the movement of carriage is monitored, and analyzing the result comprehensively, the ink remaining amount detection is performed, in consideration of the variation of ink liquid level with the movement of carriage 10. For embodiment, the detected results from the three states are averaged, or integrated with time for a predetermined time (for a multiplicity of scans) to conduct the comprehensive determination.

(2) The timing control is made to detect the ink remaining amount under the same condition of ink liquid level at any time, such that the timing of ink remaining amount detection always occurs in a predefined one of the above three states (e.g., a state of FIG. 8).

In either way, the obtained results are used for the determination whether the ink remains or not at step S1.

Accordingly, with this embodiment, the ink remain detection is effected under the same condition of liquid level, in consideration of the variation in the state of ink liquid level with the movement of carriage, or the ink remain detection is made by estimating the state change comprehensively, whereby the more accurate ink remaining amount detection can be achieved. Thereby, the precise recording control can be realized in view of the ink remaining amount.

Figure 25B:
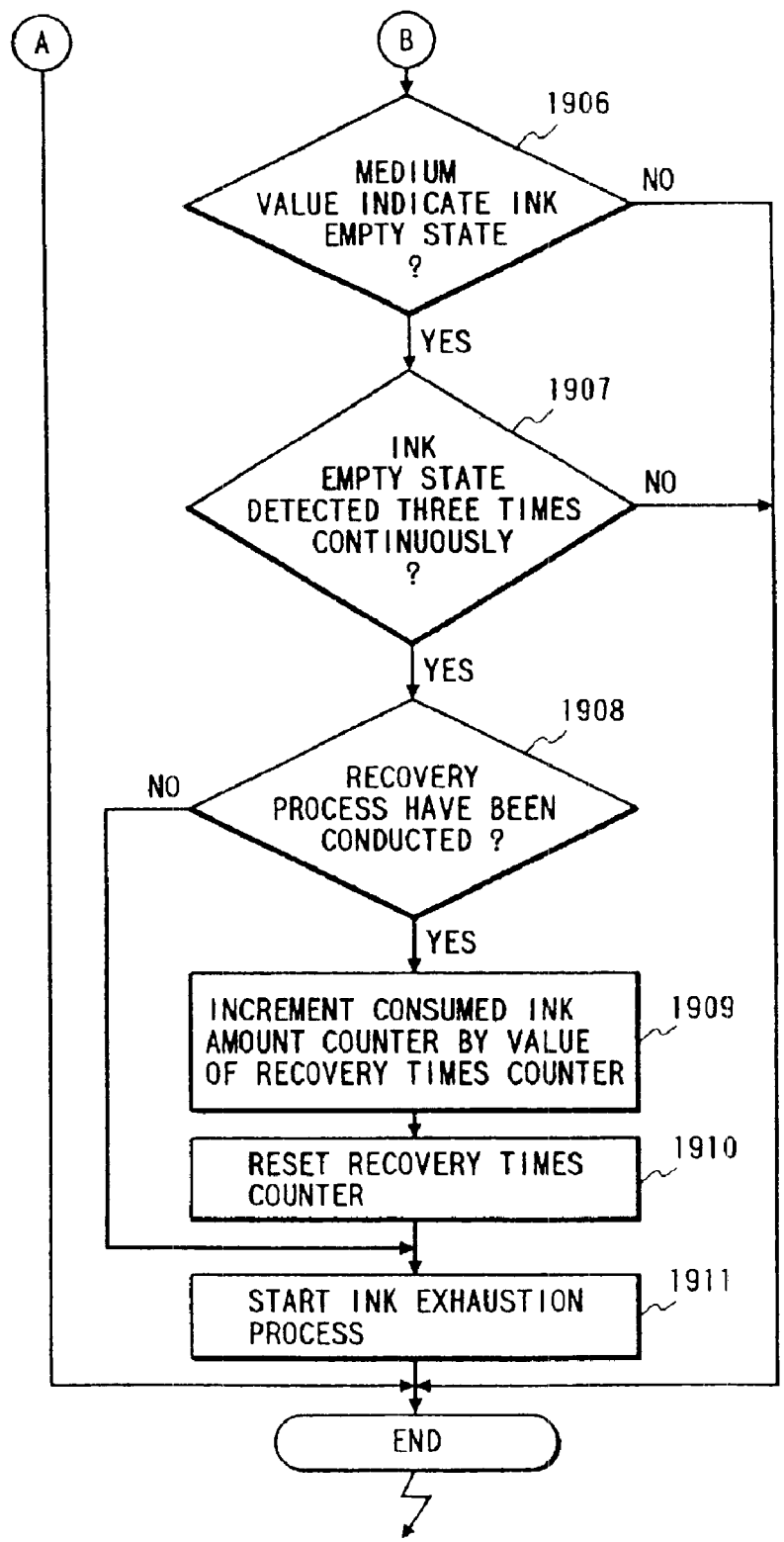
FIG. 25, consisting of FIGS. 25A and 25B, shows a flowchart illustrating an ink check process.

Referring now to FIGS. 25A and 25B, an ink check process will be described.

The ink check process is executed by an interruption from the timer 11011 of the gate array 110 every 5 msec. Herein, the reason why the ink check process is performed by interruption is that the ink check process can be securely performed prior to other processes at the deceleration time optimal to the ink check process, as shown in FIGS. 17A and 17B. That is, this is because when the ink check process is performed in a series of tasks as previously described, there is the possibility that the ink check process may be disenabled by any other processes at the deceleration time optimal to the ink check process. Therefore, herein, the ink check process is performed by interruption prior to other processes. Also, the ink check process may be performed through a task having higher priority than other tasks, rather than the interruption, thereby allowing the process to be performed at the deceleration time optimal to the ink check process.

The CPU 101 determines whether the ink check flag within the work area 207 is set (1901). If the ink check flag is not set, this process is ended. On the other hand, if the ink check flag is set, the CPU 101 determines whether ink cartridge empty is already decided, based on the ink empty flag within the work area 207 (1902). If the ink cartridge empty is already decided, this process is ended. On the other hand, if the ink cartridge empty is not decided, the CPU 101 determines whether the ink exhaustion processing flag within the work area 207 is set (1903). The ink exhaustion process will be described later. Then, the CPU 101 determines whether the process is during the deceleration period, based on the carriage driving pattern, carriage driving counter and recording width counter value (1904). If not, this process is ended, or otherwise, the operation proceeds to step 1905. At step 1905, the ink remaining amount is detected by means of the photosensor 11. Herein, the reflected light from the reflection plate 93 is detected three times every 10 msec. Herein, the medium value of three detected values is adopted as a detected value. This process is repeated 20 times for 200 msec. Then, the operation proceeds to step 1906, where the CPU determines whether any medium value indicates that the ink is empty (1906). If no medium value indicates that the ink is empty, this process is ended, or otherwise, this process is repeated for 30 msec (3 times) to determine whether the ink empty is detected (1907). If the ink empty is not determined three times continuously, the ink remain is assumed and this process is ended. On the other hand, if the ink empty is determined three times continuously, the ink empty is assumed, and the operation proceeds to step 1908.

This ink exhaustion process (or ink long-life process) will be described.

Even if the ink 91 becomes empty, the recording is made possible for a while by the ink soaked into a sponge 92. Therefore, the ink exhaustion process is a process of utilization the ink within the sponge 92 completely by estimating the amount of ink dischargeable by which the ink within the sponge 92 has been used up since the ink 91 becomes empty.

The discharge amount (consumption) of ink is obtained by counting the ink amount discharged during the normal recording by means of an ink consumption counter. Further, the number of recovery operations from the previous ink check to the current ink check is counted. This is necessary to correct for the discharge amount to include the suction amount, because the amount of ink sucked by the recovery operation is significantly greater than the ink consumed amount during the normal recording.

Step 1908 is explained again.

At step 1908, the CPU determines whether the recovery operation has been performed from the previous ink check process, based on the recovery number counter within the work area 207. If the recovery operation is not performed, the recovery number counter is reset (1910), the ink exhaustion process is started (1911), and this process is ended. On the other hand, if the recovery operation is performed, the ink consumed amount counter is incremented by the count value of recovery times (100,000 counts for one recovery operation) to make correction, the ink exhaustion process by such recovery times is started (1910), and this process is ended.

During the ink exhaustion process (1912), the CPU determines whether any recovery operation is performed since the previous ink check, based on the recovery times counter within the work area 207 (1913). If any recovery operation is performed, the operation proceeds to step 1913, where the ink consumed amount counter within the work area 207 is incremented by the count value of recovery times counter (1913), and the recovery times counter is reset (1914). Then, the CPU determines whether the ink consumed amount counter has counted the ink amount contained within the sponge 92, based on the count value of the ink consumed amount counter (1915). If the count value is exceeded, the ink empty flag within the work area 207 is set, and this process is ended. If not, this process is ended.

On the other hand, if no recovery operation is performed (1912), the processing at step 1915 is performed.

Figure 26:
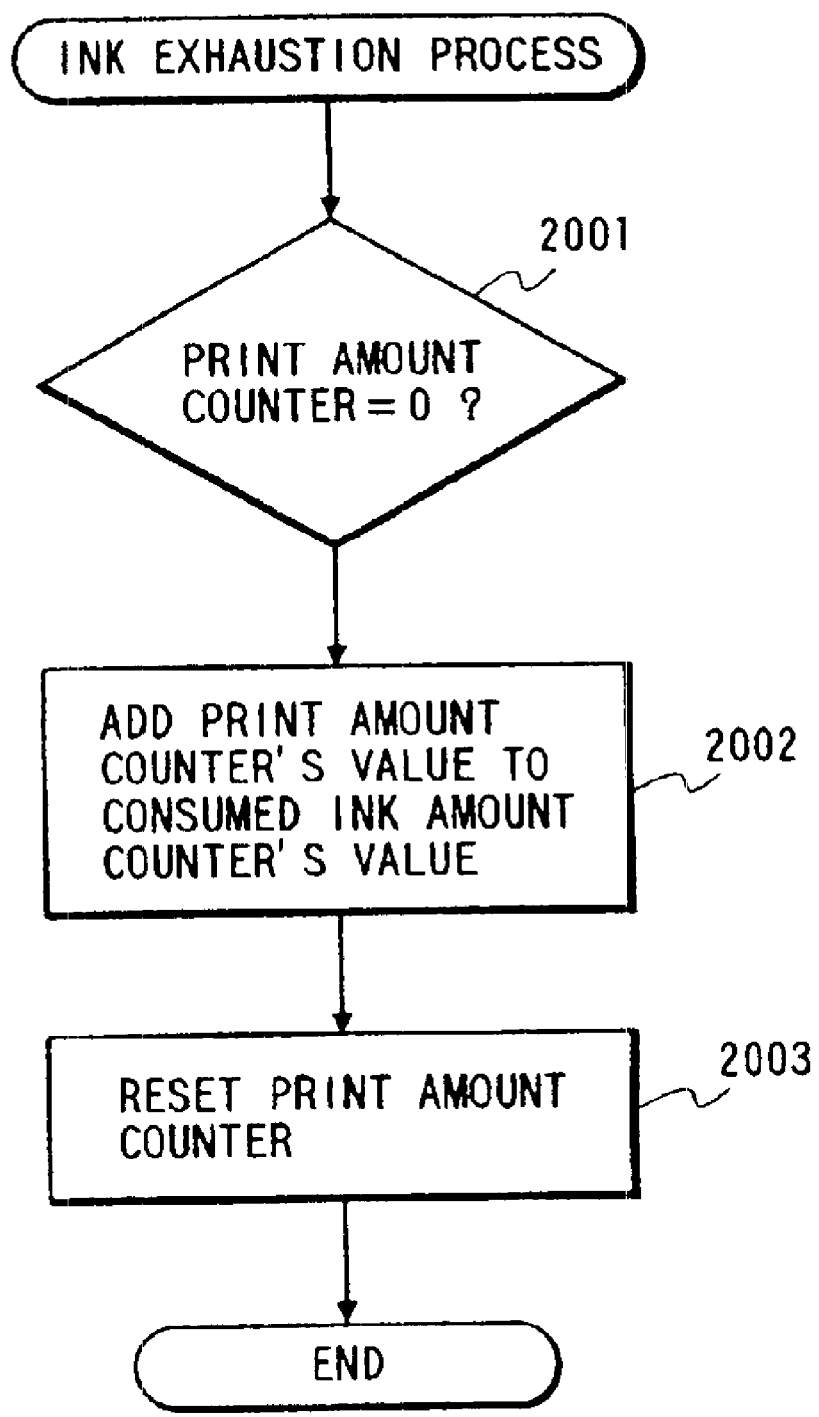
FIG. 26 is a flowchart showing an ink exhaustion process.
Figure 27:
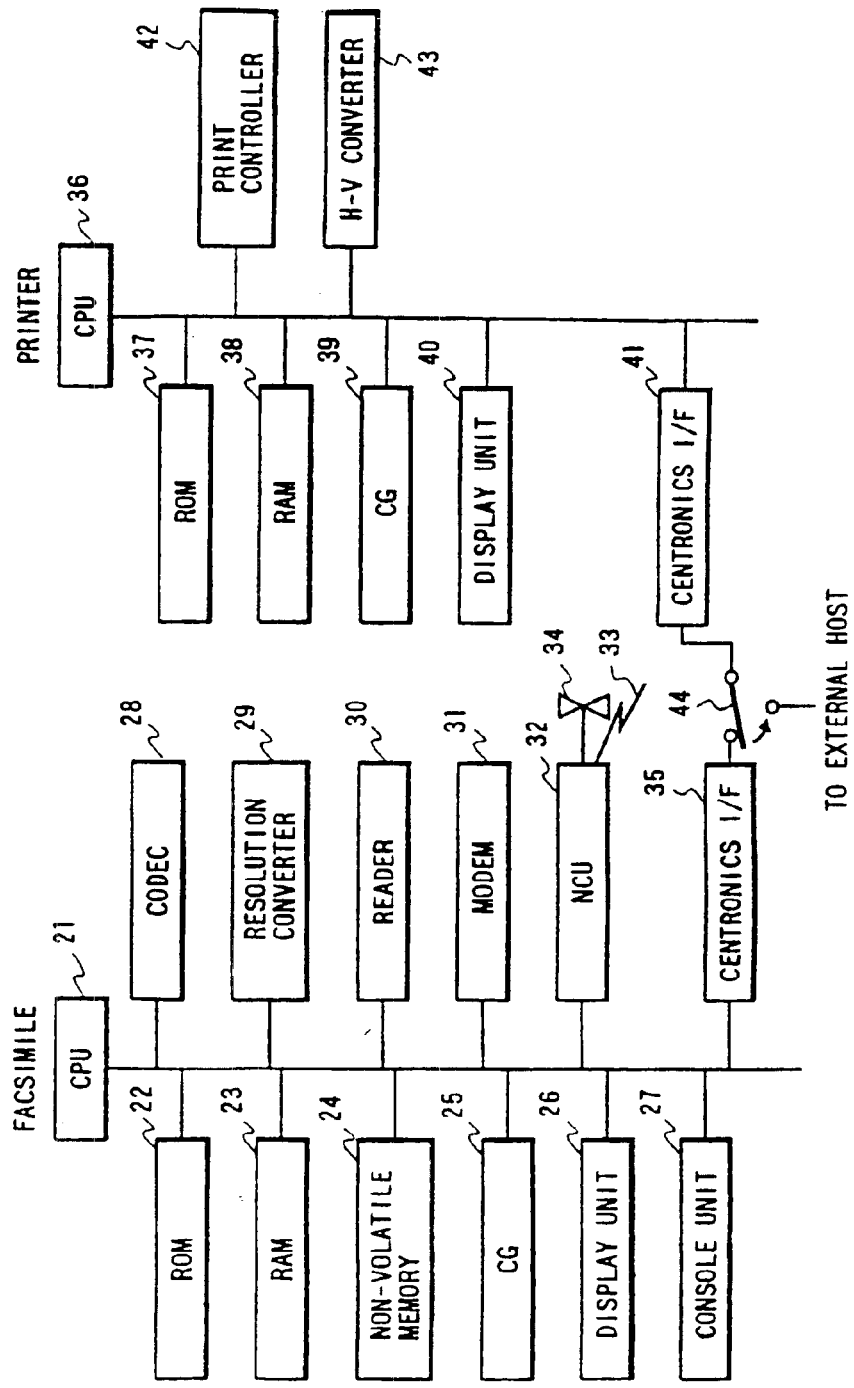
FIG. 27 is a block diagram showing a constitutional embodiment of a conventional facsimile apparatus.
Figure 28:
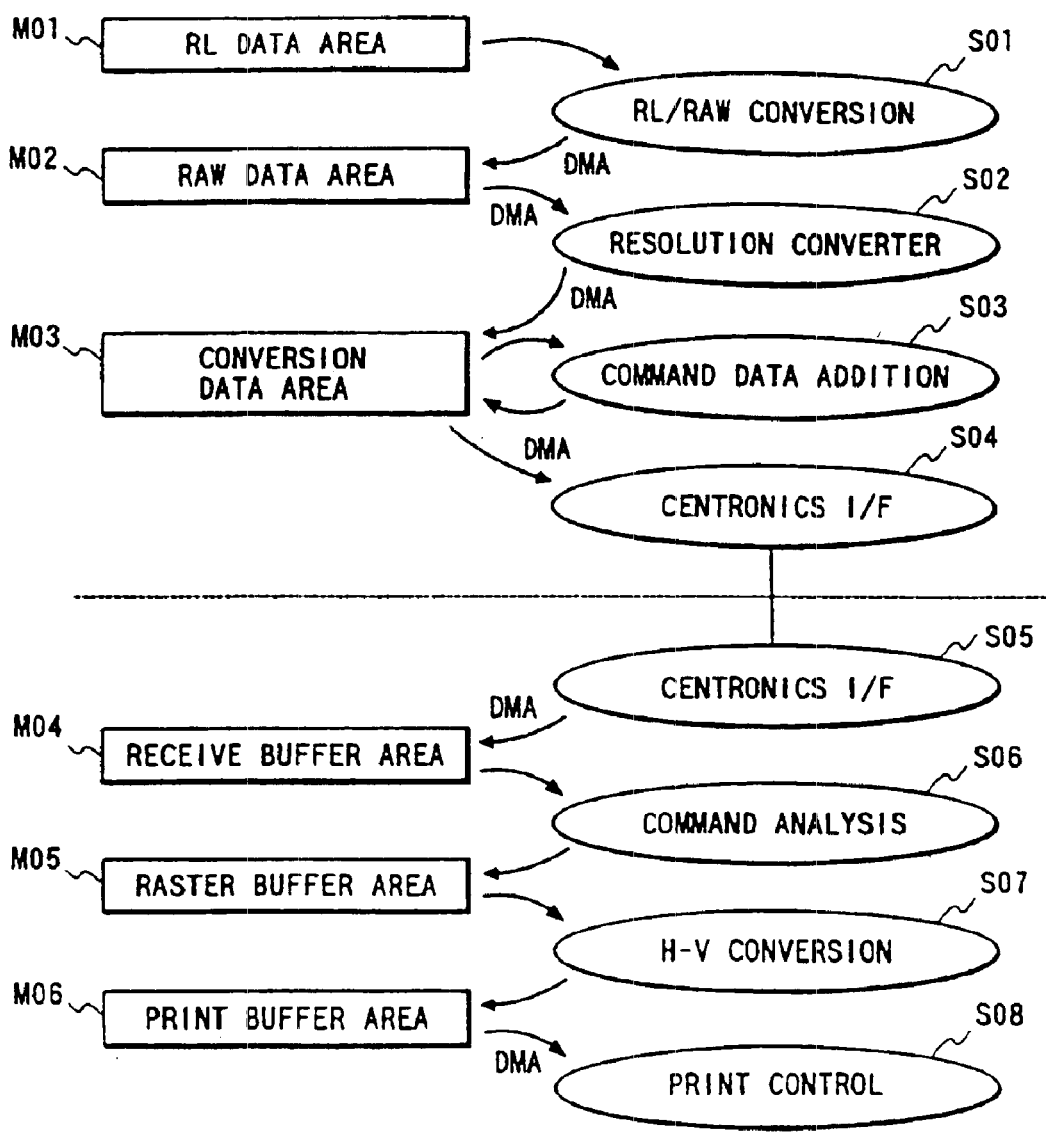
FIG. 28 is an explanatory diagram showing the operation of a recording system in the above conventional embodiment.
Figure 29:
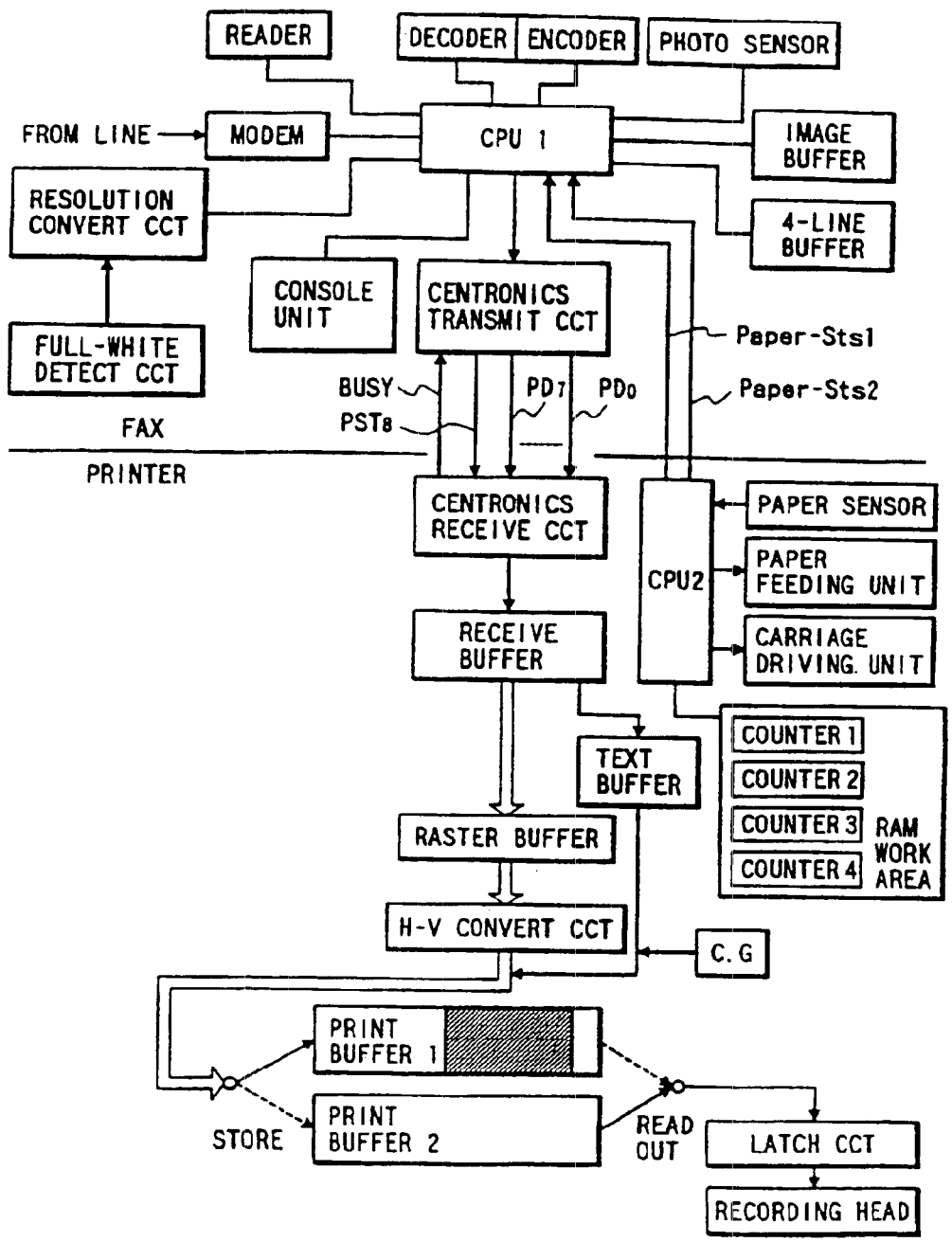
FIG. 29 is a block diagram showing another configuration of a conventional facsimile apparatus.

Referring now to FIG. 26, the ink exhaustion process is explained.

In the background of this processing, the print counter within the work area 207 accumulates the data regarding the number of printed dots every time the print operation is performed.

If the ink exhaustion process is started by the ink check process, the CPU determines whether the count value of the print amount counter is equal to zero (2001), and if not zero, the count value of the print amount counter is added to the count value of the ink consumed amount counter (2002). Then, the print amount counter is reset (2003), and this process is ended.

As will be understood from the above explanation, the necessary task is only started at the required time so as to allow only necessary tasks to be performed faster.

Also, because the processing is not occupied by one task, the effective distributed process can be made.

As the method of detecting the ink remaining amount, a method of ascertaining that a certain mark has been recorded at a predefined position on the recording sheet, or a method of detecting the discharged ink by discharging the ink at a predetermined position can be included in the present invention, as far as the timing of lighting up the light source or the timing of detection is controlled as in this application.

As above described, it is possible to provide a low price, small, and fast processing facsimile apparatus and a facsimile control method.

Also, with one control means, the facsimile unit and the printer unit can be controlled.

Further, the image memory for conversion and recording can be constituted of one storage. Further, the work area for image control and recording control can be commonly used, whereby the wasteful area can be eliminated.

Furthermore, in the facsimile apparatus having a recording head of shuttle type, the recording process and the receiving process can be performed in real time at high speed.

Also, the detection of consumable goods such as the ink can be performed at the optimal time.

Furthermore, the time of lighting up the light source for the ink remaining amount detection is optimized to prevent aging deterioration of the light source to the utmost.

What is claimed is:

1. An image communication apparatus comprising:

receiving means for receiving an image;

recording means for recording the image;

recording head control means for controlling the operation of a shuttle-type recording head, wherein said recording head control means comprises recording control means for reading and recording data in said second buffer means in accordance with the position of the recording head;

scanning means for scanning the recording head onto a recording medium;

first accumulation means for accumulating a received image;

second accumulation means for accumulating at least a part of the received image for recording, wherein said second accumulation means comprises first buffer means for temporarily accumulating an image transferred from said first accumulation means and second buffer means for accumulating H-V converted data into which data in said first buffer means is H-V converted; and third accumulation means for accumulating parameters for controlling the operation of the recording head, wherein said first, second and third accumulation means are constituted by a single accumulator.

2. An image communication apparatus according to claim 1, wherein said third accumulation means comprises first management means for managing first accumulation means and second management means for managing second accumulation means.

3. An image communication apparatus according to claim 1, further comprising resolution conversion means for converting the received image into a resolution of the recording head.

* * * * *